(12) United States Patent
Boudier

(10) Patent No.: US 9,905,037 B2
(45) Date of Patent: Feb. 27, 2018

(54) SYSTEM, METHOD, AND COMPUTER PROGRAM PRODUCT FOR REJECTING SMALL PRIMITIVES

(71) Applicant: NVIDIA Corporation, Santa Clara, CA (US)

(72) Inventor: Pierre Serge Boudier, Los Gatos, CA (US)

(73) Assignee: NVIDIA Corporation, Santa Clara, CA (US)

( * ) Notice: Subject to any disclaimer, the term of this patent is extended or adjusted under 35 U.S.C. 154(b) by 122 days.

(21) Appl. No.: 14/862,046

(22) Filed: Sep. 22, 2015

(65) Prior Publication Data
US 2017/0084078 A1 Mar. 23, 2017

(51) Int. Cl.
G06T 17/00 (2006.01)
G06T 15/00 (2011.01)
G06T 11/40 (2006.01)

(52) U.S. Cl.
CPC ............ *G06T 15/005* (2013.01); *G06T 11/40* (2013.01)

(58) Field of Classification Search
None
See application file for complete search history.

(56) References Cited

U.S. PATENT DOCUMENTS

| | | | | |
|---|---|---|---|---|
| 7,369,140 B1* | 5/2008 | King | ..................... | G06T 15/503 345/421 |
| 8,004,522 B1* | 8/2011 | Toksvig | ................ | G06T 15/503 345/426 |
| 8,325,203 B1* | 12/2012 | Donham | ................. | G06T 11/40 345/611 |
| 2003/0164840 A1* | 9/2003 | O'Driscoll | ............ | G06T 11/203 345/611 |
| 2010/0117979 A1* | 5/2010 | Hillis | .................. | G06F 3/04883 345/173 |
| 2013/0342547 A1* | 12/2013 | Lum | ..................... | G06T 15/005 345/505 |
| 2014/0267276 A1* | 9/2014 | Hakura | ................. | G06T 15/005 345/426 |

* cited by examiner

*Primary Examiner* — Kyle Zhai
(74) *Attorney, Agent, or Firm* — Zilka-Kotab, PC

(57) ABSTRACT

A system, method, and computer program product are provided for rejecting small primitives. A three-dimensional (3D) primitive is received and a position within the primitive is identified. The primitive has a size that is less than a threshold value. Sub-pixel coverage information is read from a pixel sample map using the position. If the position coincides with a sub-pixel sample according to the sub-pixel coverage information, then the 3D primitive is processed. Otherwise, the 3D primitive is rejected.

17 Claims, 14 Drawing Sheets

SYSTEM, METHOD, AND COMPUTER PROGRAM PRODUCT FOR REJECTING SMALL PRIMITIVES

FIELD OF THE INVENTION

The present invention relates to graphics processors, and more particularly to efficiently processing primitives utilizing graphics processors.

BACKGROUND

When graphics primitives are rendered the pixels that are covered by each primitive are determined during rasterization. A primitive is identified as covering a pixel when the primitive covers a sample location within the pixel. The sample location may be at the center of the pixel, a corner, or another predetermined location. Small graphics primitives having an area that is smaller than a single pixel may not cover any any samples within a pixel. Rasterizing primitives that do not cover any sample of a pixel consumes rasterization resources without contributing to an image. As the number of small graphics primitives increases, the amount of time spent rasterizing primitives that do not cover samples increases and the time needed to render each image may increase, slowing the frame rate. There is thus a need for addressing these and/or other issues associated with the prior art.

SUMMARY

A system, method, and computer program product are provided for rejecting small primitives. A three-dimensional (3D) primitive is received and a screen-space position within the small primitive is identified. The primitive has a size that is less than a threshold value. Sub-pixel coverage information is read from a pixel sample map using the position. If the position coincides with a sub-pixel sample according to the sub-pixel coverage information, then the 3D primitive is processed. Otherwise, the 3D primitive is rejected.

DETAILED DESCRIPTION

Small primitives that do not cover any samples of a pixel should be rejected before rasterization to improve the primitive processing throughput of a graphics processing pipeline. In conventional graphics processing, during rasterization edge equations for each primitive, even small primitives, are tested against each sample of a pixel that the primitive intersects. Testing each edge of a primitive requires at least three computations for each sample of a pixel, assuming the primitives are triangles. As the number of samples per pixel increases, the number of computations also increases. Therefore, identifying and discarding small primitives that do not cover any samples before rasterization can reduce the number of edge equation computations during rasterization (i.e., scan conversion).

In the context of the following description, a small primitive or a bounding box (or bounding volume) that encloses the small primitive may have an area that is less than the area of a single pixel. In some embodiments, a small primitive or bounding volume that encloses the small primitive may have any area that is approximately equal a sub-pixel (i.e., a portion of a pixel).

As previously described, when a pixel includes multiple samples, such as when a multi-sample rendering mode is enabled, the number of computations scales by the number of samples that are defined for the pixel. As many as 4, 8, 16, 24, or more samples may be defined for the pixel based on the multi-sample rendering mode. Rather than testing each edge for each sample, a pixel sample map may be used to determine if at least one sample may be covered by the small primitive. Small primitives that do not cover any samples may be rejected before rasterization. The number of small primitives that are rasterized and then rejected after determining that no samples are covered based on rasterized coverage data is reduced.

Figure 1:
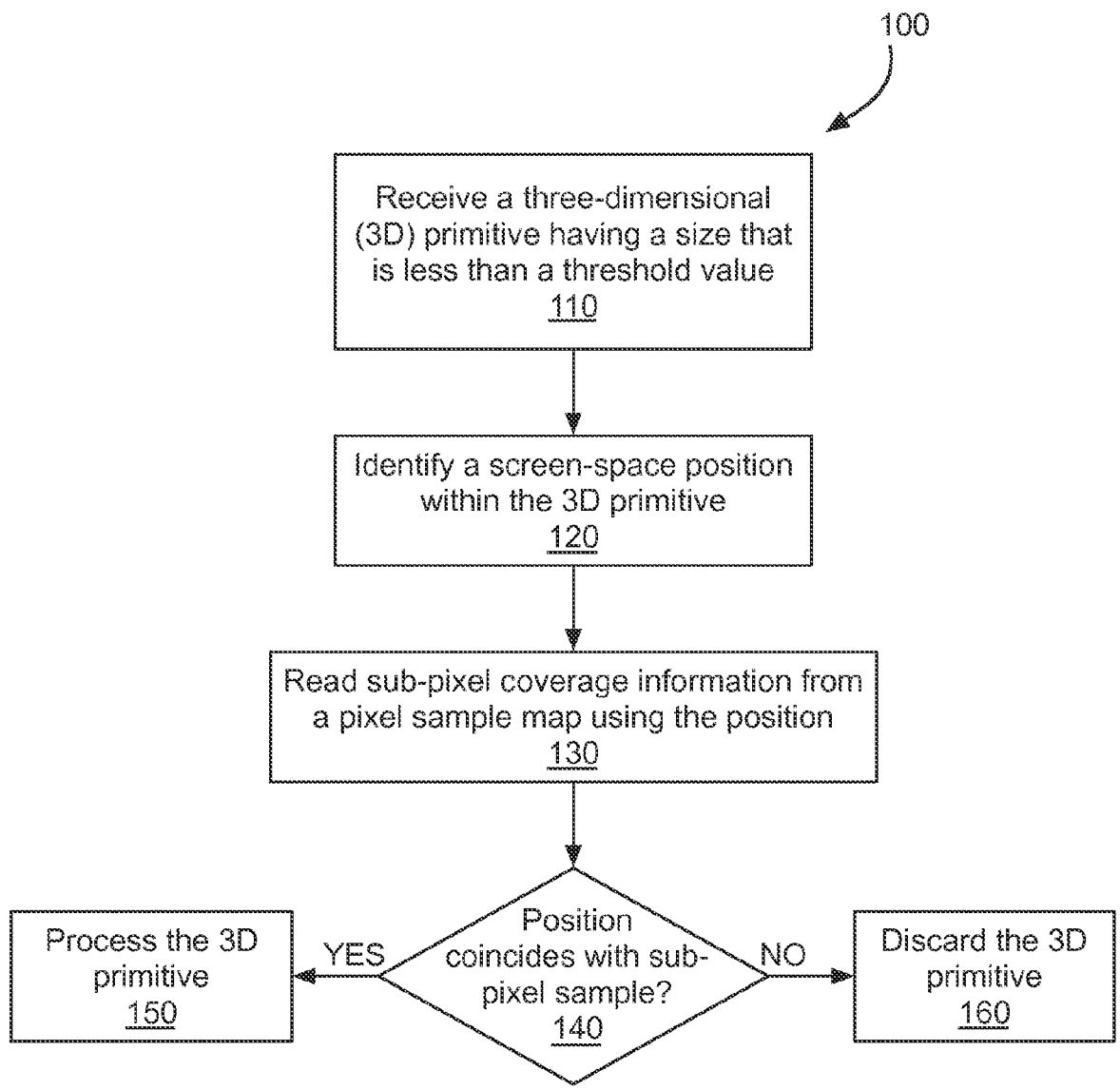
FIG. 1 shows a method for rejecting small primitives, in accordance with one embodiment.

FIG. 1 shows a method 100 for rejecting small primitives, in accordance with one embodiment. At step 110, a small 3D primitive is received. In the context of the present description, a primitive refers to any element (e.g. a polygonal element, etc.) that is capable of being utilized to image a polygon (e.g. such as a triangle, a rectangle, etc.), or that is capable of being used to image a figure capable of being represented by polygons. Further, in the context of the present description, primitive-specific attributes refer to attributes that are associated with an entire primitive beyond just a subset portion (e.g. a vertex, etc.) thereof. For example, in various embodiments, the primitive-specific attribute may include a viewport index, a render target array index, a color attribute, a generic attribute, and/or a mask attribute, etc. In one embodiment, the primitive-specific attribute may not necessarily be limited to a specific vertex. For example, in one embodiment, only primitive-specific attributes may be generated in association with the primitive by avoiding generation of vertex-specific attributes. In the context of the following description, a small 3D primitive is a 3D primitive having a size that is less than a threshold value. In one embodiment, the threshold value may be the area of a sub-pixel.

In various embodiments, the 3D primitive may be received by a graphics processor. In the context of the following description, the graphics processor may include any number of graphics processor pipeline units, as well as associated hardware and software. For example, in one embodiment, the graphics processor may include a vertex shader, a tessellation initialization shader, a tessellation shader, and a geometry shader. Moreover, in one embodiment, the vertex shader and the geometry shader may each operate on a single streaming multiprocessor.

At step 120, a screen-space position within the primitive is identified. In one embodiment, the screen-space position is the position of a centroid of the small primitive. In another embodiment, the screen-space position is the position of a center of a bounding box that encloses the small primitive. Each pixel is divided into a grid of screen-space coordinates, so that a pixel may include N×M grid positions, where N and MA are each integers. In one embodiment, N=M=64. The screen-space position that is identified within the small primitive may be aligned at integer screen-space coordinates or may be aligned between grid positions and have a fractional component for one or more screen-space coordinates.

At step 130, sub-pixel coverage information is read from a pixel sample map using the screen-space position. In one embodiment, the screen-space position corresponds to two-dimensional coordinates of the pixel grid and the two-dimensional coordinates are used to read a value from the pixel sample map. In one embodiment, the fractional portion of the screen-space coordinates are used to read a value from the pixel sample map. The pixel sample map corresponds to a single pixel that is accessed using coordinates ranging from 0 to 1. In the context of the following description, the pixel sample map defines locations of samples within the pixel. The values stored in the pixel sample map indicate the positions of the pixel grid where samples are located. In one embodiment, the pixel sample map is a texture map that is read using the pixel grid coordinates using a point-sample sampling mode. In one embodiment, a resolution of the pixel sample map is used that enables the entire pixel sample map to be stored within a cache.

At step 140, if the screen-space position coincides with a sub-pixel sample according to the sub-pixel coverage information, then at step 150 the 3D primitive is processed. Otherwise, at step 160, the 3D primitive is rejected and discarded. In embodiment, the pixel sample map stores a 1-bit value for each map location, where a TRUE value indicates that the map location coincides with a sub-pixel sample and a FALSE value indicates that the map location does not coincide with a sub-pixel sample. In another embodiment, the pixel sample map stores one or more bits for each map location and each value encodes a distance between the location of a nearest sub-pixel sample within the pixel. For example, a value of zero indicates the location coincides with a sub-pixel sample and a value of one indicates that the location of the nearest sub-pixel sample is one pixel grid position away (in any coordinate direction) from a nearest sample.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2A:
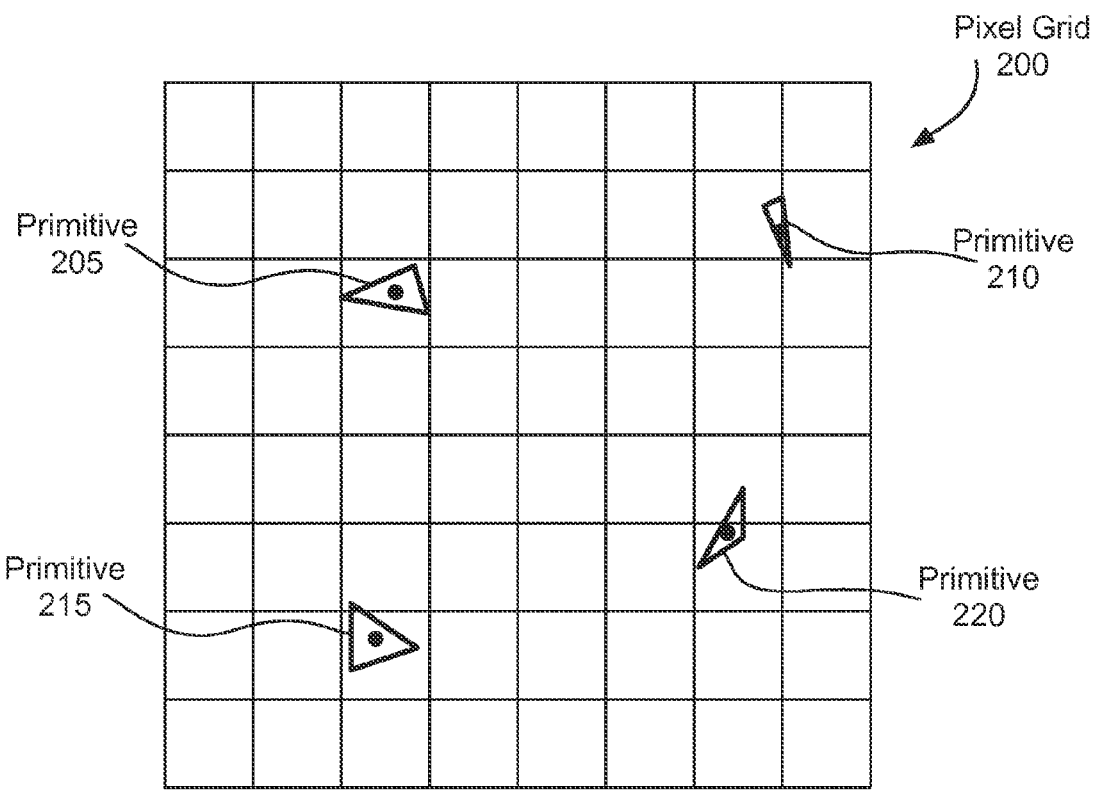
FIG. 2A shows an illustration of a pixel grid and small primitives, in accordance with one embodiment.

FIG. 2A shows an illustration of a pixel grid 200 and small primitives, in accordance with one embodiment. The primitives 205, 210, 215, and 220 are small primitives. The center of each small primitive is indicated with a dot. In one embodiment, the center is the position of the small primitive. As shown in FIG. 2A, the center of each primitive is not necessarily aligned at integer coordinates of the pixel grid 200. The pixel grid 200 is shown as an 8×8 grid. In other embodiments, the pixel grid 200 may be a different size in width and/or height.

Figure 2B:
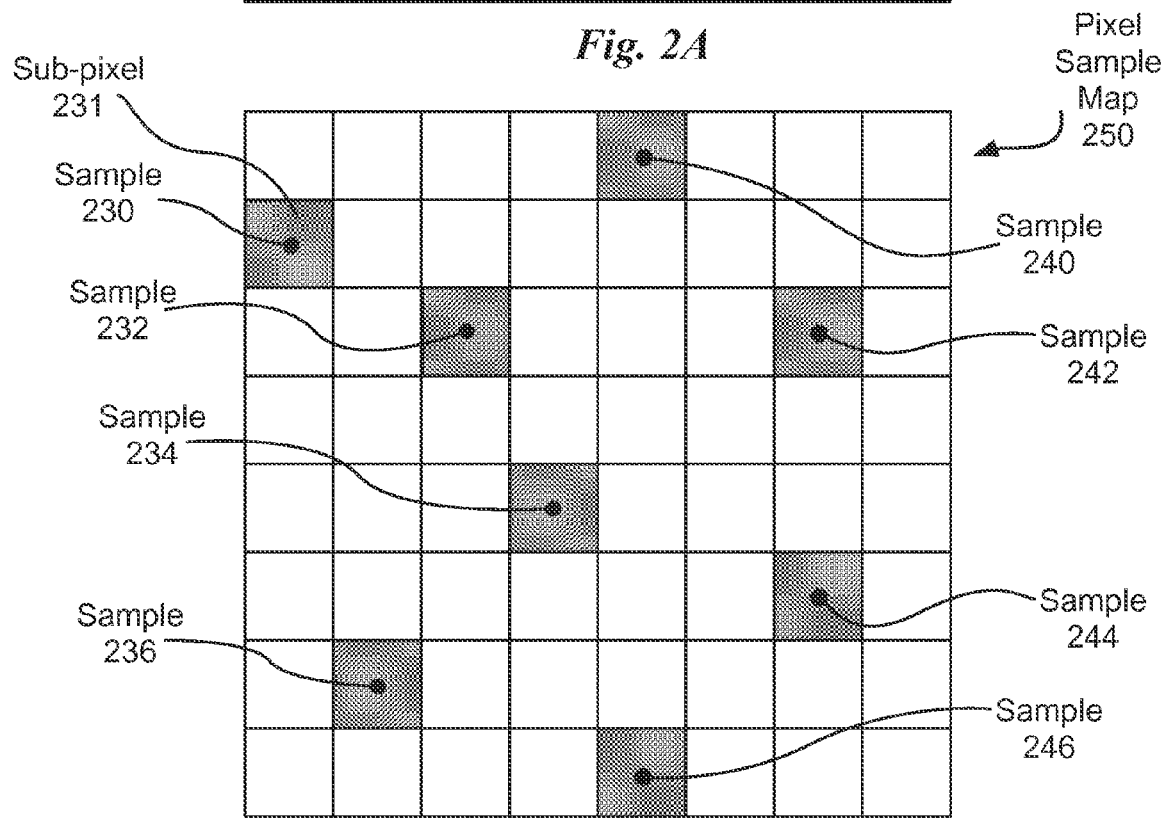
FIG. 2B shows an illustration of a pixel sample map, in accordance with one embodiment.

FIG. 2B shows an illustration of a pixel sample map 250, in accordance with one embodiment. Each of the samples 230, 232, 234, 236, 240, 242, 244, and 246 is located at integer coordinates within a grid. Therefore, a location of a particular sample is the coordinates of the sample. In one embodiment, the grid is the pixel grid 200. In other embodiments, the pixel sample map 250 may be higher or lower resolution compared with the pixel grid 200. Primitives that intersect a sample may cover the sample. The pixel sample map 250 includes eight sub-pixel sample locations as may be used when an eight multi-sample rendering mode is enabled. In other embodiments, a different number of sub-pixel sample locations may be defined. Each of the eight sub-pixel sample locations is centered within a sub-pixel. For example, the sample 230 is centered within a sub-pixel 231 and the area of the sub-pixel 231 corresponds to the sample 230 within the pixel. The locations of the samples may be defined to vary between pixels in which case, the pixel sample map 250 may specify the sample locations for multiple pixels.

The pixel sample map 250 may be encoded as sub-pixel coverage information values, where a single bit indicates whether each cell in the grid is a location of a sub-pixel sample within a pixel. For example, as shown in FIG. 2B, the grid for the pixel sample map 250 includes 64 different locations (e.g., grid cells) so 64 single bit values may be stored where each value corresponds to a different location. The values may be accessed using the position corresponding to each small primitive. A value of TRUE may indicate a sample location and a value of FALSE may indicate a location that does not correspond to a sample.

Figure 2C:
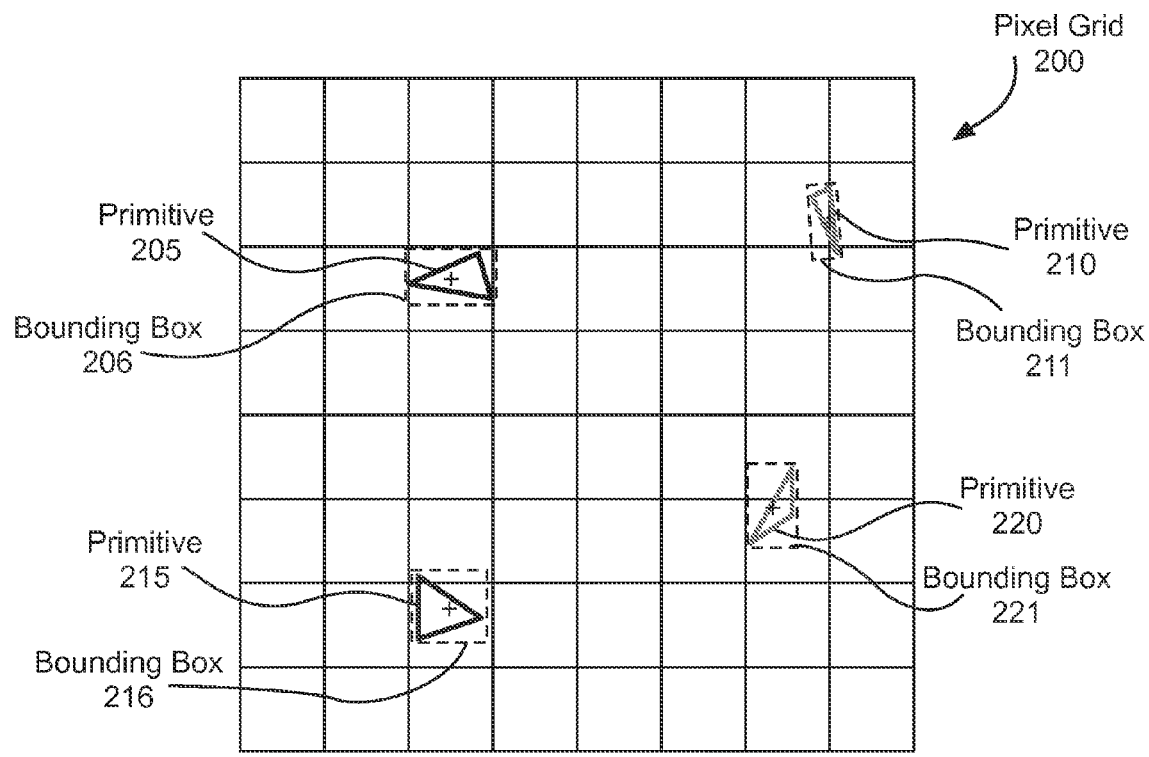
FIG. 2C shows an illustration of the pixel grid and small primitives enclosed by bounding boxes, in accordance with one embodiment.

FIG. 2C shows an illustration of the pixel grid 200 and the small primitives 205, 210, 215, and 220, where each small primitive is enclosed by a bounding box 206, 216, 211, and 220, respectively, in accordance with one embodiment. Each bounding box encloses at least the primitive. In one embodiment, a bounding box is sized to enclose a threshold perimeter around the primitive so that the bounding box is "conservative" representation of the primitive. The bounding boxes may be bounding volumes that enclose a three-dimensional space including the primitive.

A size of the bounding box may be computed and used to determine whether the primitive is a small primitive. Importantly, the resolution of the grid for the pixel sample map 250 should correspond to the largest dimension (e.g., width or height) of the small primitives that will be tested. In other words, the primitives that are larger than the size of a sample are not considered to be small primitives. Primitives that are larger than a sample cannot be reliably tested using the technique described in FIG. 1 when a point-sampling sample mode is used because the larger primitives may cover more than one grid location. The dimensions of the bounding box for a primitive may be used to determine whether the primitive is a small primitive. For example, in one embodiment, only primitives having a bounding box with a width and height that are both less than the smaller of a grid cell width and height are small primitives.

In one embodiment, the center of each bounding box is not necessarily aligned at integer coordinates of the pixel grid 200 and the center of the bounding box is used as the position of the primitive. Note that the largest dimensions of the bounding boxes 206, 211, 216, and 221 are each smaller than the grid cell width and height.

Figure 2D:
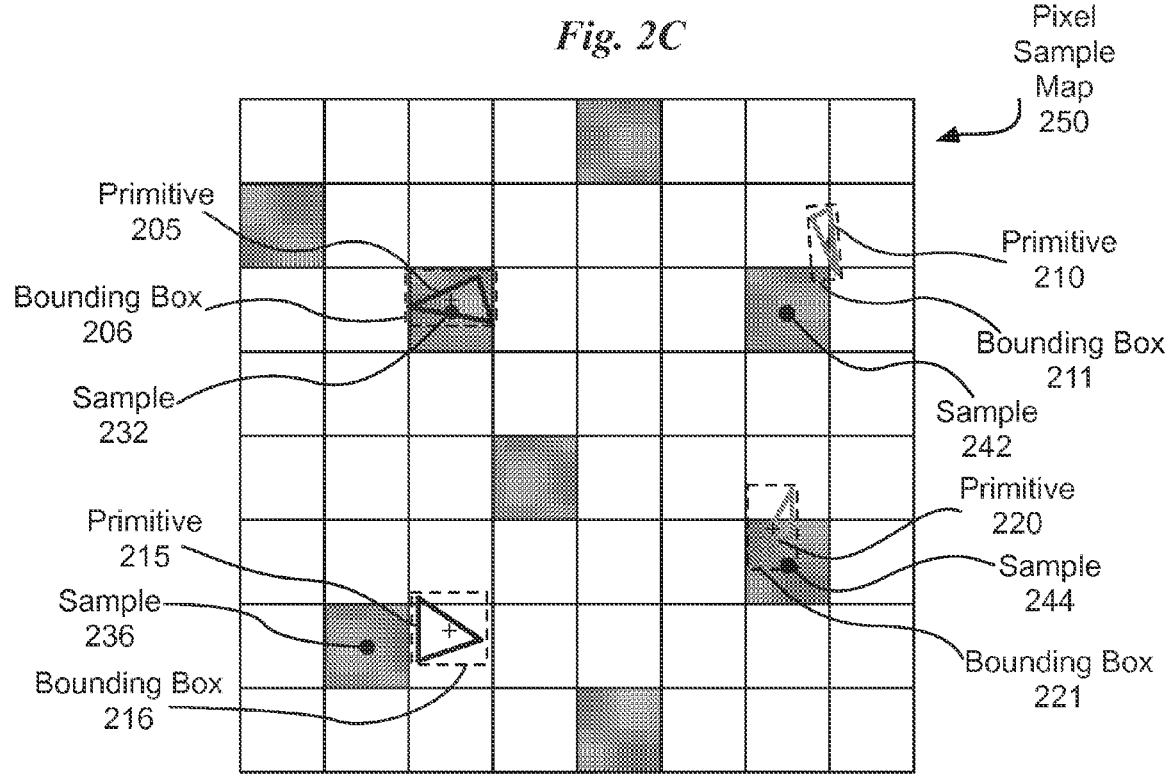
FIG. 2D shows an illustration of the pixel sample map for the small primitives and bounding boxes shown in FIG. 2C, in accordance with one embodiment.

FIG. 2D shows an illustration of the pixel sample map 250 for the small primitives and bounding boxes shown in FIG. 2C, in accordance with one embodiment. The samples 230, 234, 240, 244, and 246 from FIG. 2B are shown in FIG. 2D with the labels omitted. The primitive 205 and the bounding box 206 that encloses the primitive 205 both cover the sample 232.

The bounding box for a primitive is a conservative representation of the primitive because the bounding box covers a larger area compared with the primitive. For example, the primitive 210 does not cover the sample 242, but the bounding box 211 that encloses the primitive 210 does intersect the sample 242. However, the center of the bounding box 211 is outside of the sample 242. Therefore, the primitive 215 will be discarded because the center of the bounding box 211 is outside of the sample 242. The primitive 215 and the bounding box 216 that encloses the primitive 215 do not cover any samples. The primitive 220 and the bounding box 221 that encloses the primitive 220 both cover the sample 244. Based on the pixel sample map 250, the primitive 215 should be discarded and not rasterized.

Figure 3:
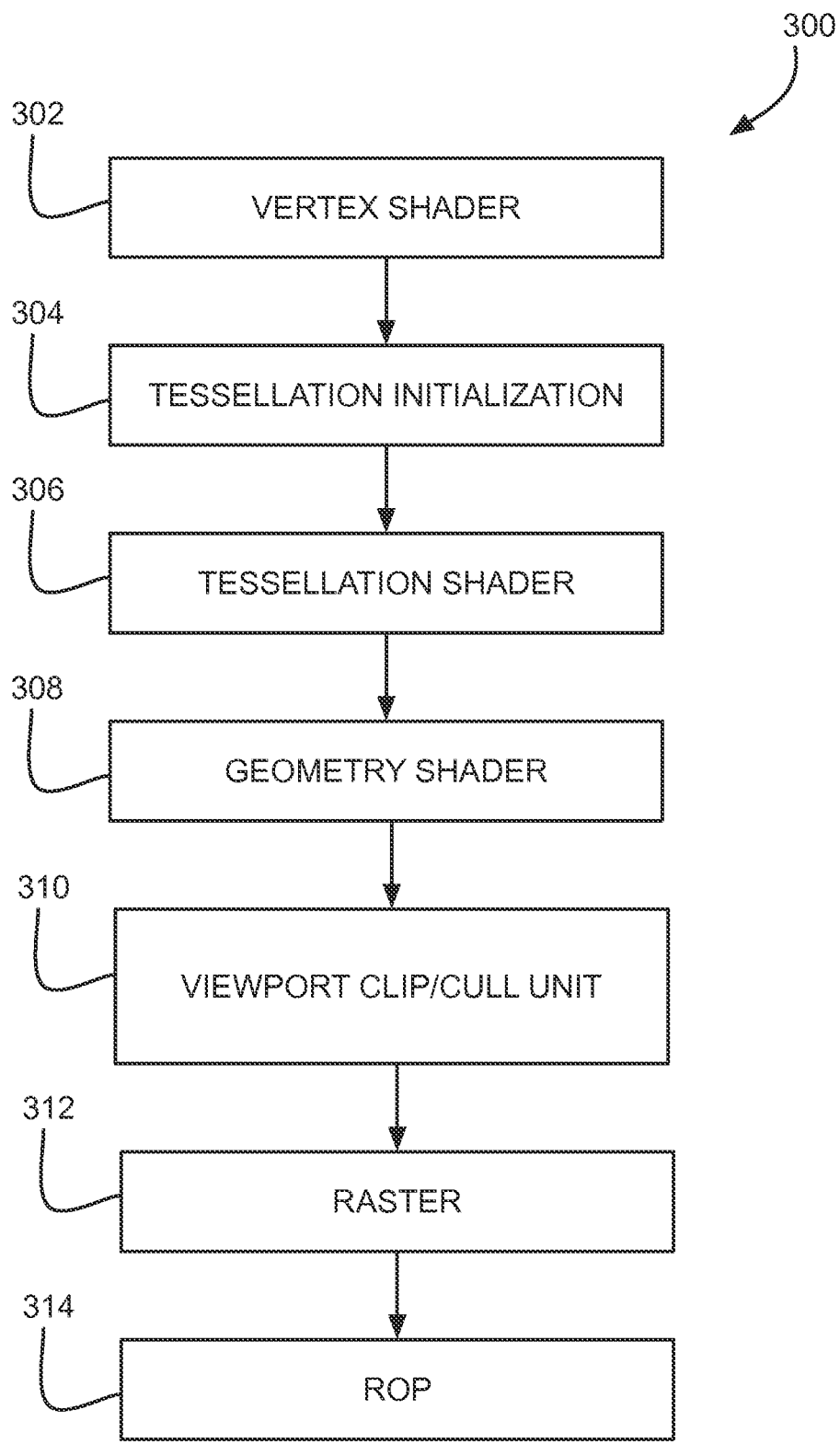
FIG. 3 shows a graphics processing pipeline, in accordance with one embodiment.

FIG. 3 shows a graphics processing pipeline 300, in accordance with one embodiment. As an option, the graphics processing pipeline 300 may be implemented in the context of the functionality and architecture of the previous Figures and/or any subsequent Figure(s). Of course, however, the graphics processing pipeline 300 may be implemented in any desired environment. It should also be noted that the aforementioned definitions may apply during the present description.

As shown, the graphics processing pipeline 300 may include at least one vertex shader 302, a tessellation initialization unit 304, a tessellation shader 306, and a geometry shader 308. In one embodiment, the vertex shader 302, the tessellation initialization unit 304, the tessellation shader 306, the geometry shader 308, and/or hardware/software associated therewith, may represent a stage of the graphics processing pipeline 300 (e.g. a "world-space shader pipeline," or "shader pipeline," etc.).

Furthermore, in one embodiment, the graphics processing pipeline 300 may include a viewport clip/cull unit 310, a raster unit 312, and a raster operations (ROP) unit 314. Additionally, in one embodiment, the raster operations unit 314 may include a processing unit that performs raster operations, such as stencil, z test, and the like, and may output pixel data as processed graphics data.

In one embodiment, the shader pipeline may operate within a streaming multiprocessor. Further, in one embodiment, the shader pipeline may include a plurality of shader units that may be enabled to process primitive data. In one embodiment, the vertex shader 302, the tessellation initialization unit 304, the tessellation shader 306, the geometry shader 308, and/or hardware/software associated therewith, may sequentially perform processing operations. Once the sequential processing operations performed by the shaders within the shader pipeline are complete, in one embodiment, the viewport clip/cull unit 310 may utilize the data. In one embodiment, primitive data processed by the shader pipeline may be written to cache (e.g. L1 cache, a vertex cache, etc.). In this case, in one embodiment, the viewport clip/cull unit 310 may access the data in the cache. In the context of the present description, the viewport clip/cull unit 310 refers to any graphics processor related unit or units capable of transforming a three dimensional position of a vertex in virtual space to a two-dimensional coordinate (e.g. capable of being utilized for display, etc.).

Additionally, in one embodiment, the one or more vertex-specific attributes may be generated by a first stage of a pipeline of the graphics processor that is followed by a second stage of the pipeline of the graphics processor that generates the one or more primitive-specific attributes. For example, in one embodiment, the first stage may include at least one of a vertex shader, or a tessellation unit, etc., that are capable of generating the one or more vertex-specific attributes. In one embodiment, the second stage may include a geometry shader.

In the context of the present description, a vertex shader refers to any graphics processor related unit or units capable of manipulating attributes such as position, color, and texture coordinates. Further, in the context of the present description, a tessellation unit refers to any unit or units associated with a graphics processor capable of being utilized to perform tessellation. Additionally, a geometry shader may refer to any unit or code that is capable of governing the processing of primitives.

Often, it is desired to change only per-primitive attributes (i.e. attributes that are constant across the entire primitive, etc.). For example, it may be desired to change a viewport index of a primitive, a render target array index, or any other generic attribute that is constant. Accordingly, in one embodiment, a fast geometry shader (FGS) may be implemented that produces just per-primitive attributes on output, and the connectivity of the primitives, as well as the per-vertex attributes, may be defined by the last world-space shading stage prior to a geometry shader stage, which, for example, may be a vertex shader stage or a domain shader stage.

Thus, in one embodiment, a property of one new vertex per triangle (or fewer) in a triangle strip may be maintained for a fast geometry shader output. Furthermore, the fast geometry shader need not copy per-vertex attributes from input to output (e.g. as a traditional geometry shader would operate, etc.). The fast geometry shader may reduce the number of unique vertices per primitive, which may improve a rate of viewport transform processing (e.g. preformed by a viewport clip/cull unit, etc.), and improve a rate for setup processing (e.g. since only one new vertex per primitive needs to be fetched, etc.). In the context of the present description, a viewport clip/cull unit refers to any unit or group of units capable of performing clipping, culling, perspective correction, and viewport scaling operations on primitive data. Furthermore, the fast geometry shader may reduce the attribute traffic that flows between a world-space pipeline and a screen-space pipeline. Accordingly, the fast geometry shader may operate to reduce attribute bandwidth and attribute storage.

In one embodiment, the geometry shader or fast geometry shader is configured to perform the steps shown in FIG. 1. In particular, the geometry shader or fast geometry shader may be configured to determine a bounding box for a primitive and identify whether the primitive is a small primitive. The geometry shader or fast geometry shader may then reject small primitives that do not cover a sample according to the pixel sample map 250.

Further, in one embodiment, where the fast geometry shader is implemented to limit or prohibit expansion of input geometry, an optimization in the graphics pipeline may be applied such that a vertex shader and the fast geometry shader may be run in sequence on the same streaming multiprocessor without performing a re-distribution of geometry between the vertex shader and the fast geometry shader stages. In one embodiment, this may be implemented to avoid copying attributes between streaming multiprocessors. This may, in turn, eliminate overhead of time slicing between stages that normally require re-distribution (e.g. between a first stage including a vertex attribute fetch, vertex shader operation, hull shader operation, and task generation, and a second stage including topology generation, domain shader operation, geometry shader operation, and viewport clip/cull operation, etc.).

Further, in one embodiment, where the fast geometry shader mode is implemented to limit or prohibit expansion of input geometry, an optimization in the graphics pipeline may be applied such that the vertex shader 302 and the geometry shader 308 may be run in sequence on the same streaming multiprocessor without performing a re-distribution of geometry between the vertex shader 302 and the fast geometry shader 308 stages. In one embodiment, this may be implemented to avoid copying attributes between streaming multiprocessors. This may, in turn, eliminate overhead of time slicing between stages that normally require re-distribution (e.g. between a first stage including a vertex attribute fetch, vertex shader operation, hull shader operation, and task generation, and a second stage including topology generation, domain shader operation, geometry shader operation, and viewport clip/cull operation, etc.).

The graphics processing pipeline 300 may be configured to generate the pixel sample map 250 shown in FIGS. 2B and 2D. Each time that a location of a sample changes or a size of the samples changes, the pixel sample map 250 should be regenerated. For example, when the multi-sample rendering mode changes from eight to four, so that a pixel includes four sub-pixel samples instead of eight, the pixel sample map 250 is regenerated.

Figure 4A:
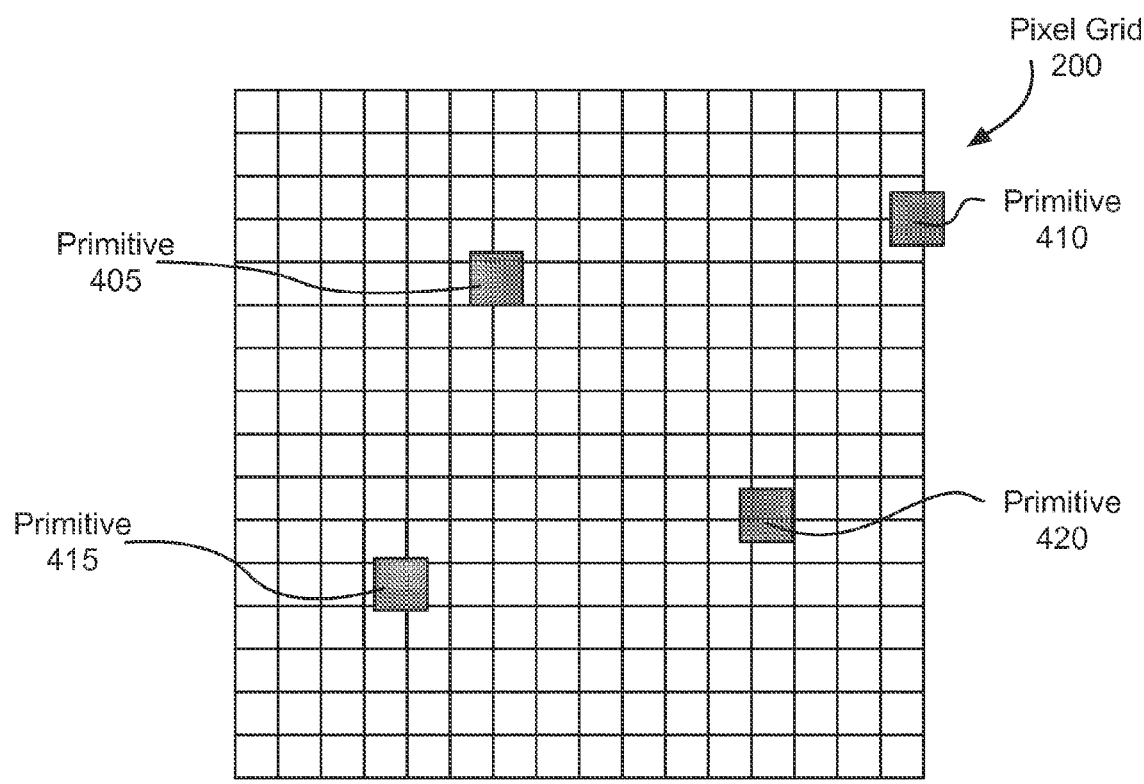
FIG. 4A shows an illustration of primitives representing samples in screen space, in accordance with another embodiment.

FIG. 4A shows an illustration of primitives representing samples in screen space, in accordance with another embodiment. Each of the primitives 405, 410, 415, and 420 corresponds to one sample of a pixel. The primitives are sized to match the dimensions of a sample and are positioned in the pixel grid 200 at the sample locations. In one embodiment, the primitives 405, 410, 415, and 420 are of equal size and the size of each primitive is the same as the size of the samples and the size of each primitive is used to identify whether a primitive is a small primitive. The primitives 405, 410, 415, and 420 are rendered by the graphics processing pipeline 300 to generate the pixel sample map.

Figure 4B:
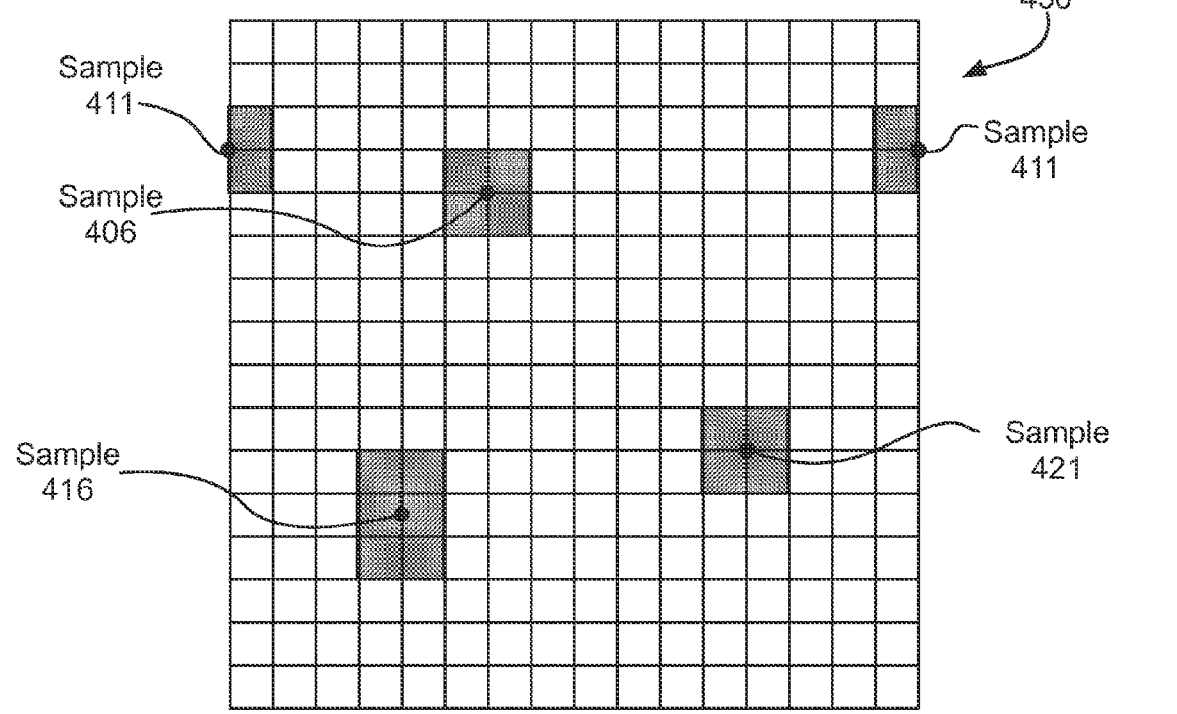
FIG. 4B shows an illustration of the primitives representing samples shown in FIG. 4A that have been rendered, in accordance with another embodiment.

FIG. 4B shows an illustration of the primitives 405, 410, 415, and 420 representing samples shown in FIG. 4A that have been rendered, in accordance with another embodiment. Each of the rendered primitives generates a corresponding sample in the pixel sample map 450. The pixel sample map 450 may be encoded as sub-pixel coverage values of a single bit per sample, as previously described. The primitive 410 corresponds with the sample 411 that "wraps" from the right side of the pixel sample map 450 to the left side. In one embodiment the pixel sample map 450 is stored as a texture map, and wrapping of the texels from right to left and from top to bottom is supported, where each texel corresponds with a cell of the pixel sample map 450. The remaining primitives 405, 415, and 420 correspond with the samples 406, 416, and 421.

Figure 4C:
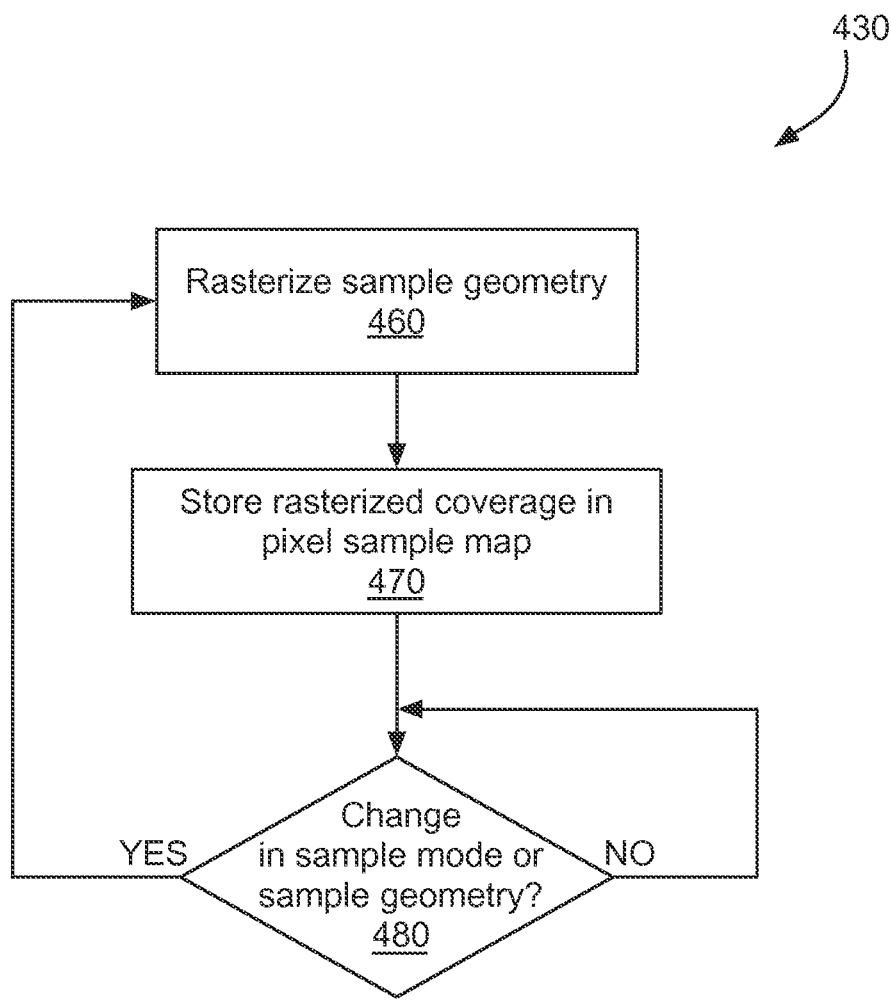
FIG. 4C shows a method for generating a pixel sample map for the rendered samples shown in FIG. 4B, in accordance with one embodiment.

FIG. 4C shows a method 430 for generating the pixel sample map 450 shown in FIG. 4B, in accordance with one embodiment. Although method 430 is described in the context of the graphics processing pipeline 300, the method 430 may also be performed by a program, custom circuitry, or by a combination of custom circuitry and a program. Furthermore, persons of ordinary skill in the art will understand that any system that performs method 430 is within the scope and spirit of embodiments of the present invention. At step 460, sample geometry is rasterized (i.e., scan converted) to produce rasterized coverage data. Examples of sample geometry are the primitives 405, 410, 415, and 420 that are the size of the samples are positioned in screen space at locations of the samples within a pixel.

The rasterized coverage data indicates which grid cells of the pixel grid 200 are covered by the sample geometry based on scan conversion of the sample geometry. Rasterization is more precise than reading sub-pixel coverage from a pixel sample map and may be used to produce high quality images using multiple samples for each pixel. For example, when the primitive 405 is rasterized, four grid cells in the pixel sample map 450 are covered that define the location and size of the sample 406. When the primitive 415 is rasterized, six grid cells in the pixel sample map 450 are covered that define the location and size of the sample 416.

At step 470, the rasterized coverage data is stored in the pixel sample map 450. In one embodiment, the rasterized coverage data is stored in memory such as a cache and/or a frame buffer or a texture map. At step 480, the graphics processing pipeline 300 determines if a sample mode has changed and/or if the sample geometry has changed. For example, the sample mode may be changed to increase or decrease the number of samples per pixel. The size or location of a sample may also be changed, as indicated by a change in the sample geometry. When the graphics processing pipeline 300 determines that a sample mode has changed and/or the sample geometry has changed, the pixel sample map should be regenerated and the graphics processing pipeline 300 returns to step 460. Otherwise, the graphics processing pipeline 300 repeats step 480.

Figures 5A, 5B:
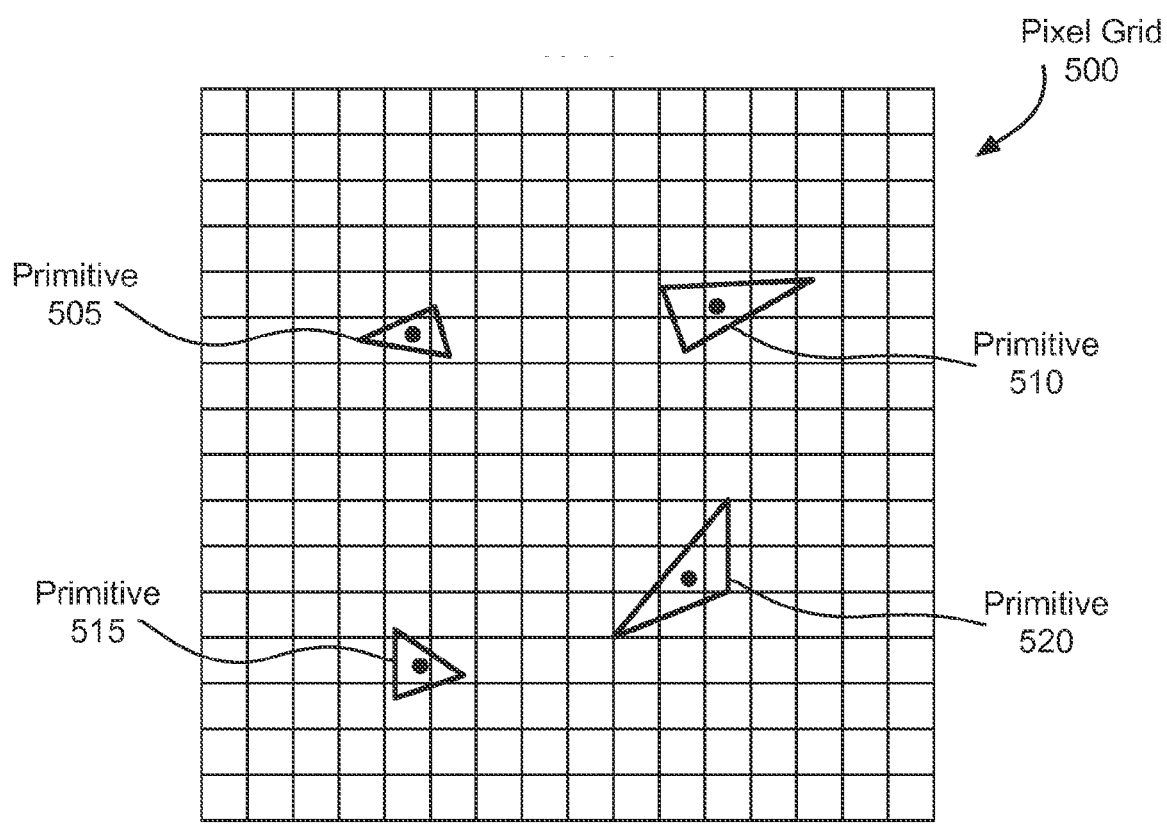
FIG. 5A shows the illustration of the pixel grid and small primitives, in accordance with one embodiment.
FIG. 5B shows an illustration of pixel sample map encoded with sample distances, in accordance with one embodiment.

FIG. 5A shows the illustration of the pixel grid 500 and small primitives, in accordance with one embodiment. The primitives 505, 510, 515, and 520 may be identified as small primitives. The center of each small primitive is indicated with a dot. In one embodiment, the center is the position of the small primitive. As shown in FIG. 5A, the center of each primitive is not necessarily aligned at integer coordinates of the pixel grid 500. The pixel grid 500 is shown as a 16×16 grid. In other embodiments, the pixel grid 500 may be a different size in width and/or height.

FIG. 5B shows an illustration of a pixel sample map 550, in accordance with one embodiment. Each of the samples 530, 532, 534, 536, 540, 542, 544, and 546 is located at integer coordinates within a grid. In contrast with the primitives 205, 210, 215, and 220 shown in FIG. 2A, the primitives 505, 510, 515, and 520 may be sized to be larger than the size of the samples and may still be identified as small primitives. However, a threshold size should be used to identify primitives as small primitives. In one embodiment, the threshold size is an integer number of cells of the pixel grid 500. For example, in FIG. 5A, the threshold size is 3×3 cells of the pixel grid 500.

As previously described, a location of a particular sample is the coordinates of the sample. In one embodiment, the grid of the pixel sample map 550 is the pixel grid 500. In other embodiments, the pixel sample map 550 may be higher or lower resolution compared with the pixel grid 500. Primitives that intersect a sample may cover the sample. The pixel sample map 550 includes eight sub-pixel sample locations as may be used when an eight multi-sample rendering mode is enabled. In other embodiments, a different number of sub-pixel sample locations may be defined. The locations of the samples may be defined to vary between pixels in which case, the pixel sample map 550 may specify the sample locations for multiple pixels.

The pixel sample map 550 may be encoded as sub-pixel coverage values, where each value indicates a distance in grid cells from the current grid cell to a nearest sub-pixel sample within a pixel. For example, as shown in FIG. 5B, the grid for the pixel sample map 250 includes 256 different locations (e.g., grid cells) so 256 multi-bit values may be stored where each value corresponds to a distance. The values may be accessed using the position corresponding to each small primitive. When compared with a size of the small primitive, whether the small primitive covers a sample may be determined.

In one embodiment, the sample locations 530, 532, 534, 536, 540, 542, 544, and 546 are encoded with a value of zero indicating that any primitive that intersects the sample location covers the sample. Locations near the top of the right edge of the pixel sample map 550 encode values of one because the sample 530 is located one grid cell away when the right side of the pixel sample map 550 wraps to the left side of the pixel sample map 550.

Figure 5C:
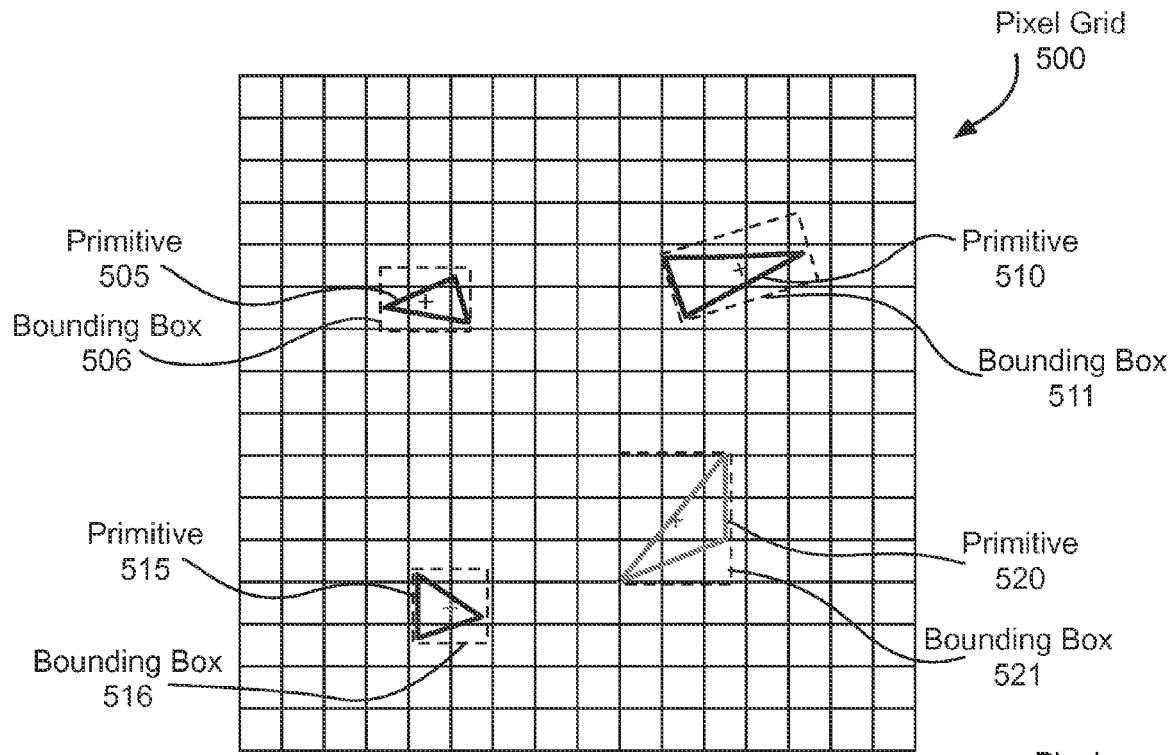
FIG. 5C shows the illustration of the pixel grid and small primitives enclosed by bounding boxes, in accordance with one embodiment.

FIG. 5C shows an illustration of the pixel grid 500 and the small primitives 505, 510, 515, and 520, where each small primitive is enclosed by a bounding box 506, 516, 511, and 520, respectively, in accordance with one embodiment. As previously described, each bounding box encloses at least the primitive. The dimensions of the bounding box for a primitive may be used to determine whether the primitive is a small primitive. For example, in one embodiment, only primitives having a bounding box with a width and height that are both less than four grid cells are small primitives.

In one embodiment, the center of each bounding box (indicated with a "+") is not necessarily aligned at integer coordinates of the pixel grid 500 and the center of the bounding box is used as the position of the primitive. The center of the bounding box 516 lies on a boundary between two grid cells and will be considered to be located within one of the two grid cells according to the rounding behavior used to determine the "horizontal" coordinate of the bounding box for accessing the pixel sample map 550. The rounding behavior should be consistent for determining bounding box coordinates and generating the pixel sample map 550 distance values.

Figure 5D:
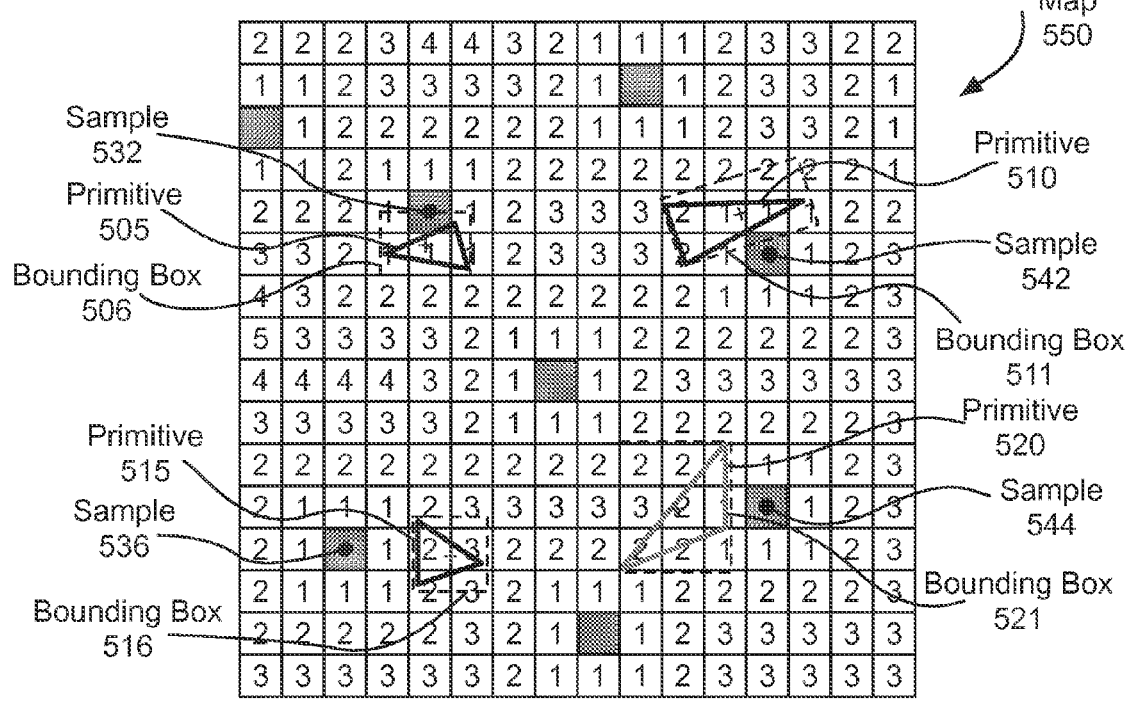
FIG. 5D shows an illustration of the pixel sample map for the small primitives and bounding boxes shown in FIG. 5C, in accordance with one embodiment.

FIG. 5D shows an illustration of the pixel sample map 550 for the small primitives and bounding boxes shown in FIG. 5C, in accordance with one embodiment. The samples 530, 534, 540, and 546 from FIG. 5B are shown in FIG. 5D with the labels omitted. The bounding box 506 has a center positioned within the grid cell below the sample 532. The size of the bounding box 506 is specified as 2×2 (the height and width are rounded to the nearest integer). When the location is read from the pixel sample map 550, the value of one indicates that the grid cell corresponding to the center of the bounding box 506 is one grid cell from a sample location. The size of the bounding box 506 is greater than the value (2>1), therefore, the bounding box 506 may cover the sample 532. In practice, it does not matter which particular sample a bounding box 506 may cover. If any sample location may be covered, the primitive corresponding to the bounding box 506 should not be discarded before rasterization. Based on the pixel sample map 550, the primitive 505 and the bounding box 506 that encloses the primitive 505 both cover the sample 532.

The bounding box 516 has a center positioned on the edge between two grid cells to the right of the sample 536. The size of the bounding box 516 is specified as 2×2. When the location is read from the pixel sample map 550, a value of two indicates that the grid cell corresponding to the center of the bounding box 506 is two grid cells from a sample location. The size of the bounding box 516 is not greater than the value, therefore, the bounding box 516 does not cover the nearest sample (e.g., sample 536). Based on the pixel sample map 550, the primitive 515 will be discarded and not rasterized.

The bounding box 511 has a center positioned within the grid cell above and to the left of the sample 542. The size of the bounding box 511 is specified as 4×2. When the location is read from the pixel sample map 550, the value of one indicates that the grid cell corresponding to the center of the bounding box 511 is one grid cell from a sample location. The size of the bounding box 511 is greater than the value (4>1), therefore, the bounding box 511 may cover a sample (e.g., the sample 542). Based on the pixel sample map 550, the primitive 510 and the bounding box 511 that encloses the primitive 510 both cover the sample 532. During rasterization it may be determined that the primitive 510 does not actually cover the sample 542 because the bounding box 511 is a conservative representation of the primitive 510.

The bounding box 521 has a center positioned two grid cells to the left of the sample 544. The distance field 550 should be conservative in representing the distance values. For example, if the size of the bounding box 521 is specified a 2.9, and the distance field reports 2, then the primitive 520 is not rejected. Alternatively, if the size of the bounding box 521 is specified as 3×3 and the distance field reports 3, then the primitive 520 is rejected. When the location is read from the pixel sample map 550, a value of two indicates that the grid cell corresponding to the center of the bounding box 521 is two grid cells from a sample location. The size of the bounding box 521 is greater than the value, therefore, the bounding box 521 may cover the nearest sample (e.g., sample 544). Based on the pixel sample map 550, the primitive 520 will not be discarded before rasterization.

Figure 6:
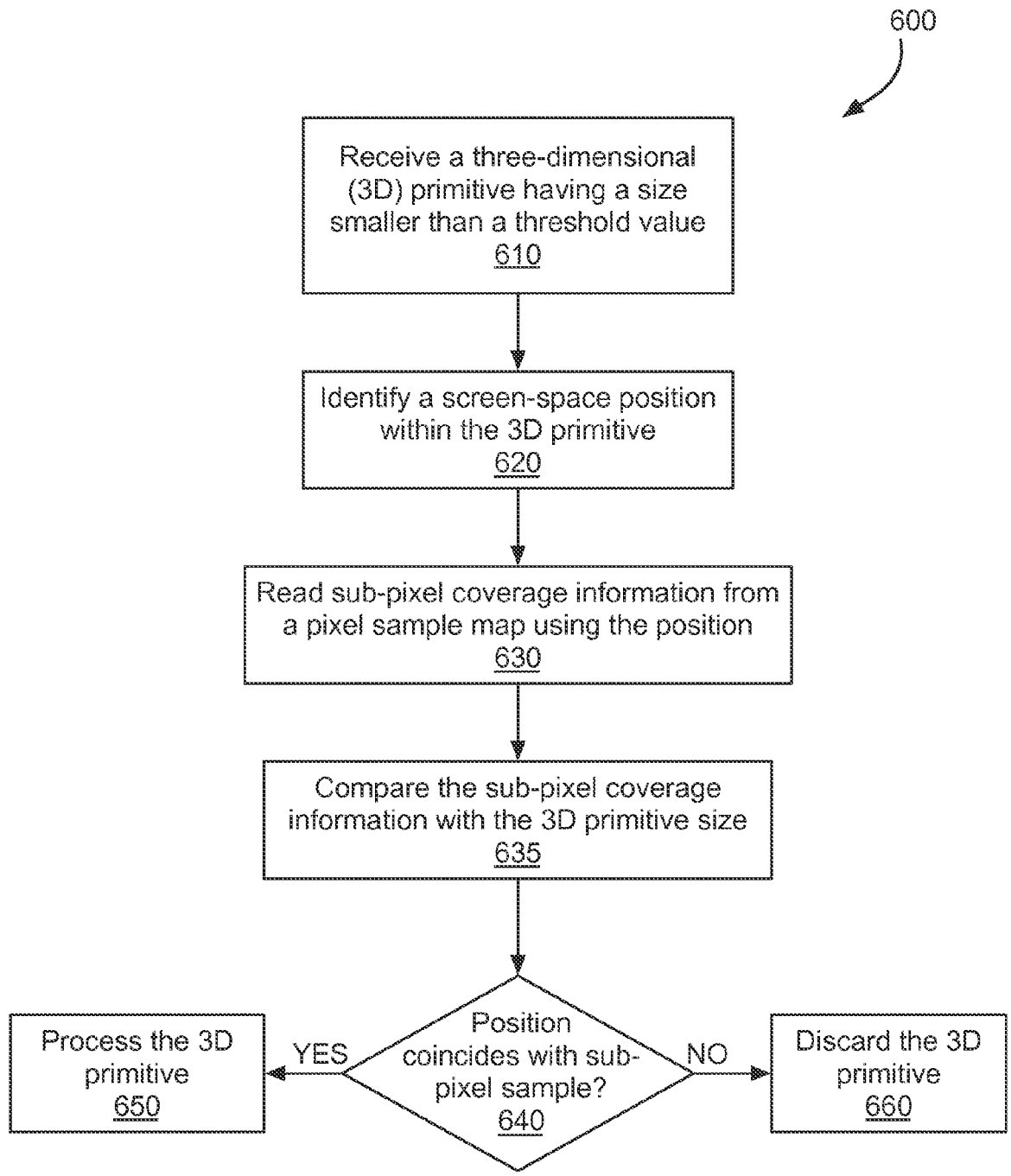
FIG. 6 shows a method for rejecting small primitives using a pixel sample map encoded with sample distances, in accordance with one embodiment.

FIG. 6 shows a method 600 for rejecting small primitives using a pixel sample map encoded with values representing sample distances, in accordance with one embodiment. At step 610, a 3D primitive is received, where the size of the 3D primitive is smaller than a threshold value. At step 620, a screen-space position within the 3D primitive is identified. In one embodiment, the screen-space position is the position of a centroid of the primitive. In another embodiment, the screen-space position is the position of a center of a bounding box that encloses the primitive. At step 630, sub-pixel coverage information is read from the pixel sample map 550 using the screen-space position. In one embodiment, the sub-pixel coverage is a value representing a distance in grid cells of the pixel sample map 550 to the nearest sample.

At step 635, the sub-pixel coverage information is compared with a size of the 3D primitive. In one embodiment, the size of the 3D primitive is the larger of the height and width (in grid cells) of a bounding box that encloses the small 3D primitive. At step 640, if the screen-space position coincides with a sub-pixel sample according to the sub-pixel coverage information, then at step 650 the 3D primitive is processed. Otherwise, at step 660, the 3D primitive is rejected and discarded. In one embodiment, the position coincides with the sub-pixel sample only when the size of the small 3D primitive is less than the sub-pixel coverage information.

The graphics processing pipeline 300 may be configured to generate the pixel sample map 550 shown in FIGS. 5B and 5D. Each time that a location of a sample changes or a size of the samples changes, the pixel sample map 550 should be regenerated. For example, when the multi-sample rendering mode changes from eight to four, the pixel sample map 550 is regenerated.

Figure 7A:
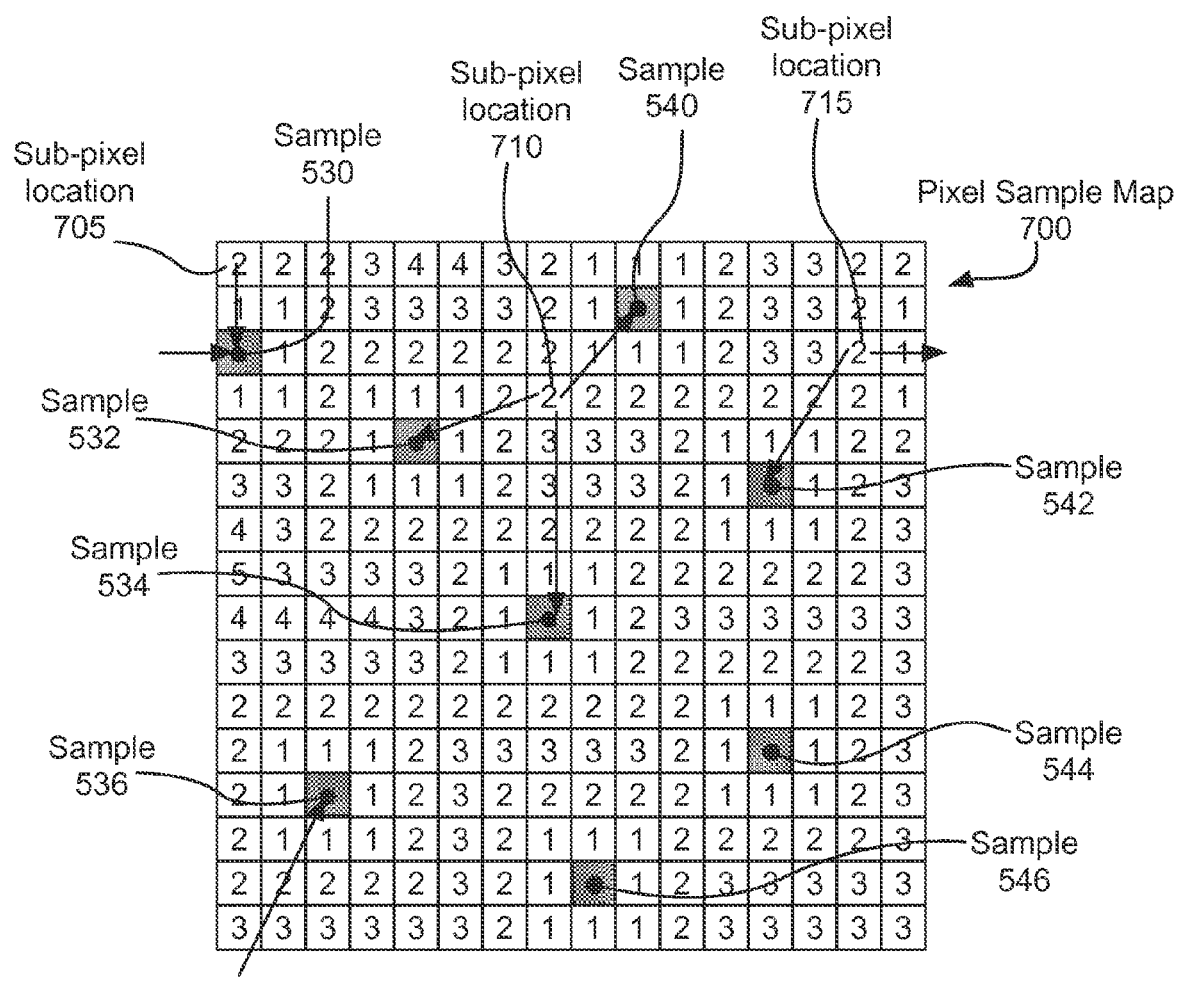
FIG. 7A shows an illustration of identifying a nearest sample to each sub-pixel location, in accordance with another embodiment.

FIG. 7A shows an illustration of identifying a nearest sample to each sub-pixel location, in accordance with another embodiment. A pixel sample map 700 encodes sub-pixel coverage as values representing the distance from each sub-pixel location to a nearest sample location. In one embodiment, the samples 532, 534, 536, 540, 542, 544, and 546 are generated using the method 430 by rasterizing sample geometry. For the sub-pixel location 710 in the pixel sample map 700, the sample 540 is two grid cells away, the sample 532 is three grid cells away, and the sample 534 is five grid cells away. The sample 540 is the nearest sample location, so the value for sub-pixel coverage of the sub-pixel location 710 is set to two. For the sub-pixel location 715 in the pixel sample map 700, the sample 542 is three grid cells away and the sample 530 is two grid cells away. The sample 530 is the nearest sample location, so the value for sub-pixel coverage of the sub-pixel location 715 is set to two. For the sub-pixel location 705 in the pixel sample map 700, the sample 530 is two grid cells away and the sample 536 is four grid cells away. The sample 530 is the nearest sample location, so the value for sub-pixel coverage of the sub-pixel location 705 is set to two.

Figure 7B:
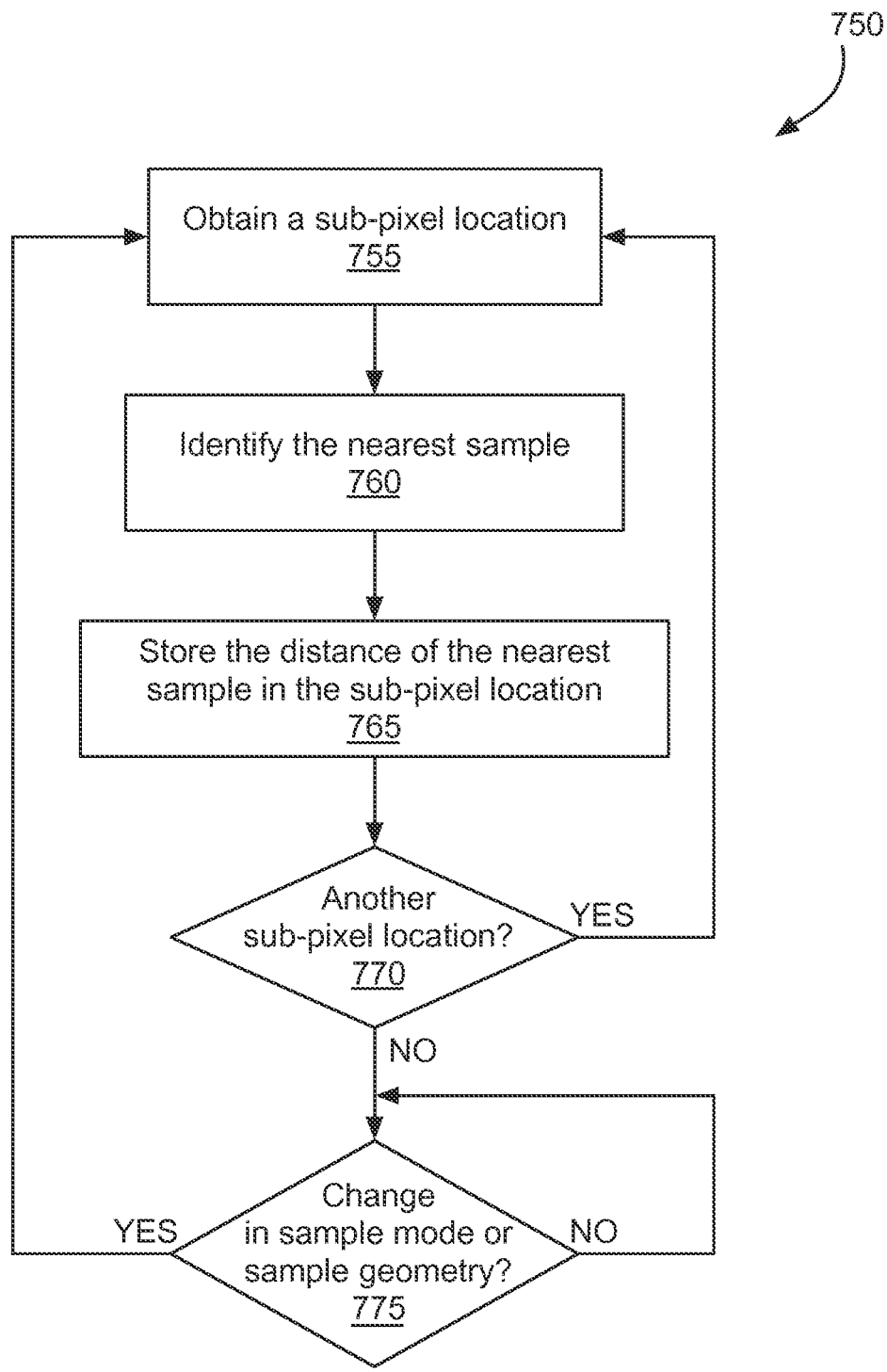
FIG. 7B shows a method for generating the pixel sample map encoded with nearest sample distances shown in FIG. 7A, in accordance with one embodiment.

FIG. 7B shows a method 750 for generating the pixel sample map 700 encoded with nearest sample distances shown in FIG. 7A, in accordance with one embodiment. Although method 750 is described in the context of the graphics processing pipeline 300, the method 750 may also be performed by a program, custom circuitry, or by a combination of custom circuitry and a program. Furthermore, persons of ordinary skill in the art will understand that any system that performs method 750 is within the scope and spirit of embodiments of the present invention. At step 755, a sub-pixel location in the pixel sample map 700 is obtained. At step 760, the nearest sample to the sub-pixel location is identified. In one embodiment, a distance field is computed to identify the nearest sample.

At step 765, the distance of the nearest sample that is identified is stored in the pixel sample map 700 for the sub-pixel location. In one embodiment, the pixel sample map 700 is stored in memory such as a cache and/or a frame buffer or a texture map. At step 770, the graphics processing pipeline 300 determines if the sub-pixel coverage should be generated for another sub-pixel location of the pixel sample map 700. If sub-pixel coverage should be generated, then the graphics processing pipeline 300 returns to step 755. Otherwise, at step 775, the graphics processing pipeline 300 determines if a sample mode has changed and/or if the sample geometry has changed. For example, the sample mode may be changed to increase or decrease the number of samples per pixel. The size or location of a sample may also be changed, as indicated by a change in the sample geometry. When the graphics processing pipeline 300 determines that a sample mode has changed and/or the sample geometry has changed, the pixel sample map should be regenerated and the graphics processing pipeline 300 returns to step 755. Otherwise, the graphics processing pipeline 300 repeats step 775.

Figure 8:
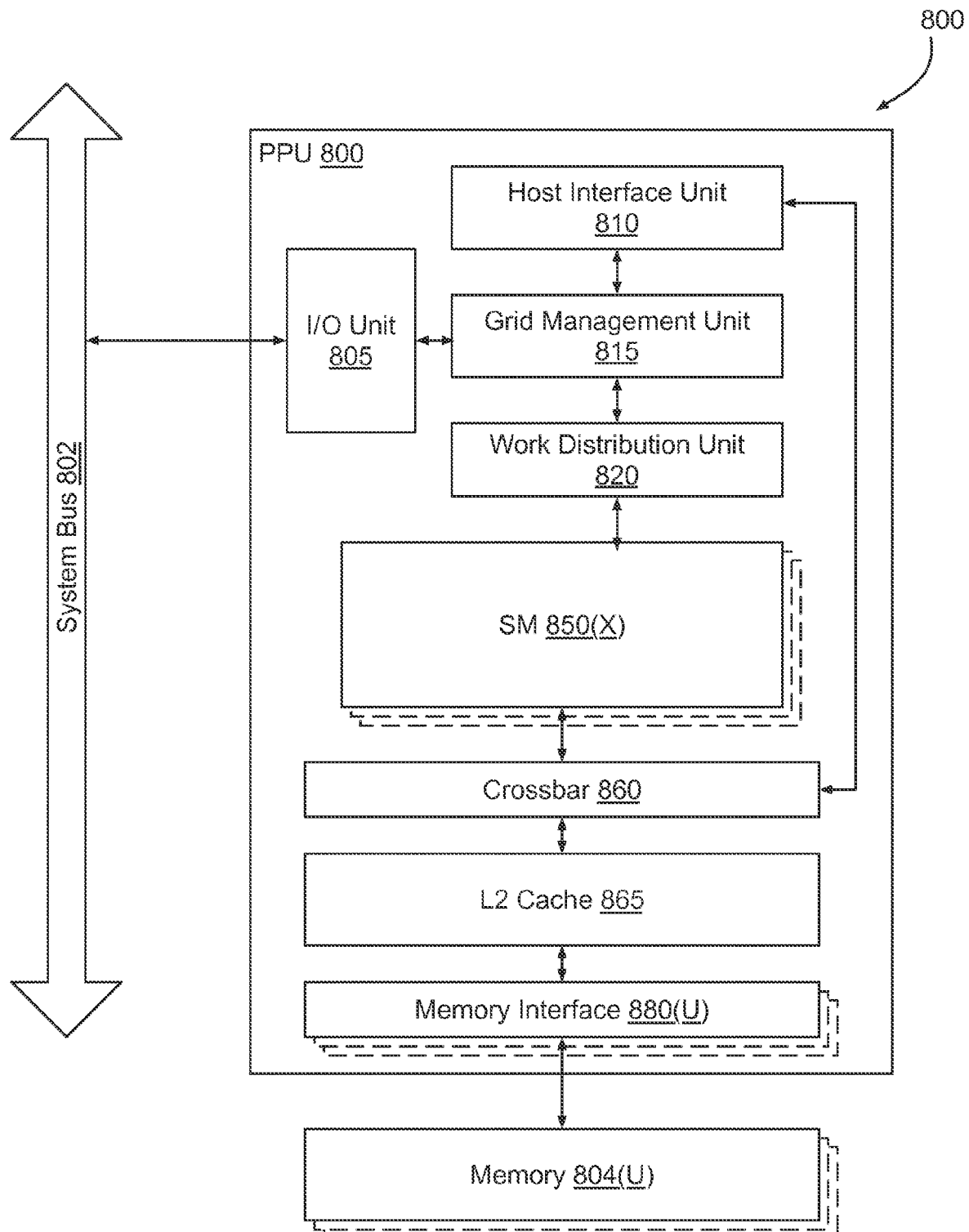
FIG. 8 illustrates a parallel processing unit, in accordance with one embodiment.

FIG. 8 illustrates a parallel processing unit (PPU) 800, in accordance with one embodiment. As an option, the PPU 800 may be implemented in the context of the functionality and architecture of the previous Figures and/or any subsequent Figure(s). Of course, however, the PPU 800 may be implemented in any desired environment. It should also be noted that the aforementioned definitions may apply during the present description.

While a parallel processor is provided herein as an example of the PPU 800, it should be strongly noted that such processor is set forth for illustrative purposes only, and any processor may be employed to supplement and/or substitute for the same. In one embodiment, the PPU 800 is configured to execute a plurality of threads concurrently in two or more streaming multi-processors (SMs) 850. A thread (i.e. a thread of execution) is an instantiation of a set of instructions executing within a particular SM 850. Each SM 850, described below in more detail in conjunction with FIG. 9, may include, but is not limited to, one or more processing cores, one or more load/store units (LSUs), a level-one (L1) cache, shared memory, and the like.

In one embodiment, the PPU 800 includes an input/output (I/O) unit 805 configured to transmit and receive communications (i.e., commands, data, etc.) from a central processing unit (CPU) (not shown) over the system bus 802. The I/O unit 805 may implement a Peripheral Component Interconnect Express (PCIe) interface for communications over a PCIe bus. In alternative embodiments, the I/O unit 805 may implement other types of well-known bus interfaces.

The PPU 800 also includes a host interface unit 810 that decodes the commands and transmits the commands to the grid management unit 815 or other units of the PPU 800 (e.g. a memory interface 880, etc.) as the commands may specify. The host interface unit 810 is configured to route communications between and among the various logical units of the PPU 800.

In one embodiment, a program encoded as a command stream is written to a buffer by the CPU. The buffer is a region in memory, e.g., memory 804 or system memory, that is accessible (i.e., read/write) by both the CPU and the PPU 800. The CPU writes the command stream to the buffer and then transmits a pointer to the start of the command stream to the PPU 800. The host interface unit 810 provides the grid management unit (GMU) 815 with pointers to one or more streams. The GMU 815 selects one or more streams and is configured to organize the selected streams as a pool of pending grids. The pool of pending grids may include new grids that have not yet been selected for execution and grids that have been partially executed and have been suspended.

A work distribution unit 820 that is coupled between the GMU 815 and the SMs 850 manages a pool of active grids, selecting and dispatching active grids for execution by the SMs 850. Pending grids are transferred to the active grid pool by the GMU 815 when a pending grid is eligible to execute, i.e., has no unresolved data dependencies. An active grid is transferred to the pending pool when execution of the active grid is blocked by a dependency. When execution of a grid is completed, the grid is removed from the active grid pool by the work distribution unit 820. In addition to receiving grids from the host interface unit 810 and the work distribution unit 820, the GMU 810 also receives grids that are dynamically generated by the SMs 850 during execution of a grid. These dynamically generated grids join the other pending grids in the pending grid pool.

In one embodiment, the CPU executes a driver kernel that implements an application programming interface (API) that enables one or more applications executing on the CPU to schedule operations for execution on the PPU 800. An application may include instructions (i.e. API calls, etc.) that cause the driver kernel to generate one or more grids for execution. In one embodiment, the PPU 800 implements a SIMD (Single-Instruction, Multiple-Data) architecture where each thread block (i.e. warp, etc.) in a grid is concurrently executed on a different data set by different threads in the thread block. The driver kernel defines thread blocks that are comprised of k related threads, such that threads in the same thread block may exchange data through shared memory. In one embodiment, a thread block comprises 32 related threads and a grid is an array of one or more thread blocks that execute the same stream and the different thread blocks may exchange data through global memory.

In one embodiment, the PPU 800 comprises X SMs 850(X). For example, the PPU 800 may include 15 distinct SMs 850. Each SM 850 is multi-threaded and configured to execute a plurality of threads (e.g., 32 threads) from a particular thread block concurrently. Each of the SMs 850 is connected to a level-two (L2) cache 865 via a crossbar 860 (or other type of interconnect network). The L2 cache 865 is connected to one or more memory interfaces 880. Memory interfaces 880 implement 16, 32, 64, 128-bit data buses, or the like, for high-speed data transfer. In one embodiment, the PPU 800 comprises U memory interfaces 880(U), where each memory interface 880(U) is connected to a corresponding memory device 804(U). For example, PPU 800 may be connected to up to 6 memory devices 804, such as graphics double-data-rate, version 5, synchronous dynamic random access memory (GDDR5 SDRAM).

In one embodiment, the PPU 800 implements a multi-level memory hierarchy. The memory 804 is located off-chip in SDRAM coupled to the PPU 800. Data from the memory 804 may be fetched and stored in the L2 cache 865, which is located on-chip and is shared between the various SMs 850. In one embodiment, each of the SMs 850 also implements an L1 cache. The L1 cache is private memory that is dedicated to a particular SM 850. Each of the L1 caches is coupled to the shared L2 cache 865. Data from the L2 cache 865 may be fetched and stored in each of the L1 caches for processing in the functional units of the SMs 850.

In one embodiment, the PPU 800 comprises a graphics processing unit (GPU). The PPU 800 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g. in a model-space coordinate system, etc.) as well as attributes associated with each vertex of the primitive. The PPU 800 can be configured to process the graphics primitives to generate a frame buffer (i.e., pixel data for each of the pixels of the display). The driver kernel implements a graphics processing pipeline, such as the graphics processing pipeline defined by the OpenGL API.

An application writes model data for a scene (i.e., a collection of vertices and attributes) to memory. The model data defines each of the objects that may be visible on a display. The application then makes an API call to the driver kernel that requests the model data to be rendered and displayed. The driver kernel reads the model data and writes commands to the buffer to perform one or more operations to process the model data. The commands may encode different shader programs including one or more of a vertex shader, hull shader, geometry shader, pixel shader, etc. For example, the GMU 815 may configure one or more SMs 850 to execute a vertex shader program that processes a number of vertices defined by the model data. In one embodiment, the GMU 815 may configure different SMs 850 to execute different shader programs concurrently. For example, a first subset of SMs 850 may be configured to execute a vertex shader program while a second subset of SMs 850 may be configured to execute a pixel shader program. The first subset of SMs 850 processes vertex data to produce processed vertex data and writes the processed vertex data to the L2 cache 865 and/or the memory 804. After the processed vertex data is rasterized (i.e., transformed from three-dimensional data into two-dimensional data in screen space) to produce fragment data, the second subset of SMs 850 executes a pixel shader to produce processed fragment data, which is then blended with other processed fragment data and written to the frame buffer in memory 804. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 800 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 800 is embodied on a single semiconductor substrate. In another embodiment, the PPU 800 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 800 may be included on a graphics card that includes one or more memory devices 804 such as GDDR5 SDRAM. The graphics card may be configured to interface with a PCIe slot on a motherboard of a desktop computer that includes, e.g., a northbridge chipset and a southbridge chipset. In yet another embodiment, the PPU 800 may be an integrated graphics processing unit (iGPU) included in the chipset (i.e., Northbridge) of the motherboard.

Figure 9:
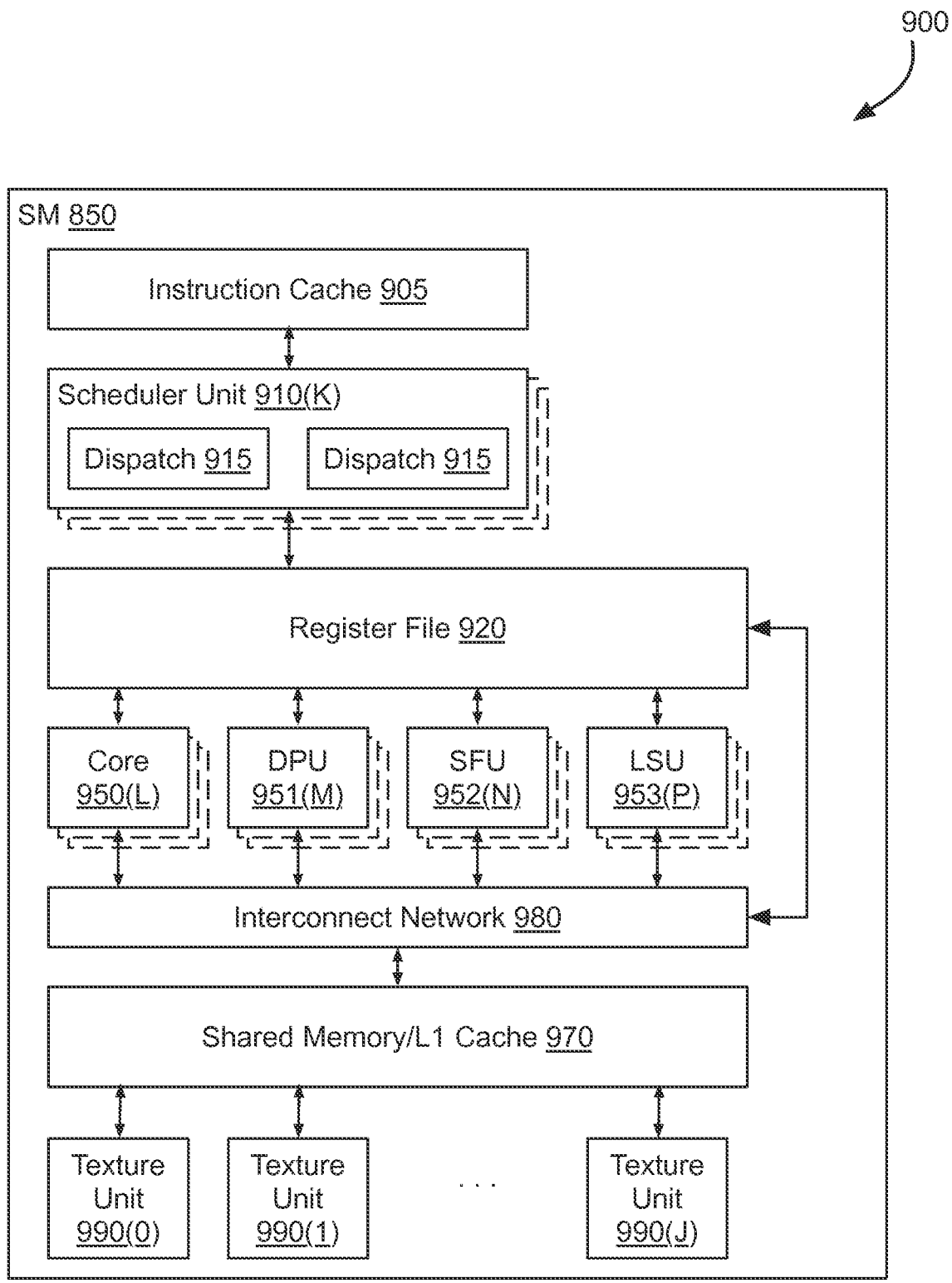
FIG. 9 illustrates the streaming multi-processor of FIG. 8, in accordance with one embodiment.

FIG. 9 illustrates the streaming multi-processor 850 of FIG. 8, in accordance with one embodiment. As shown in FIG. 9, the SM 850 includes an instruction cache 905, one or more scheduler units 910, a register file 920, one or more processing cores 950, one or more double precision units (DPUs) 951, one or more special function units (SFUs) 952, one or more load/store units (LSUs) 953, an interconnect network 980, a shared memory/L1 cache 970, and one or more texture units 990.

As described above, the work distribution unit 820 dispatches active grids for execution on one or more SMs 850 of the PPU 800. The scheduler unit 910 receives the grids from the work distribution unit 820 and manages instruction scheduling for one or more thread blocks of each active grid. The scheduler unit 910 schedules threads for execution in groups of parallel threads, where each group is called a warp. In one embodiment, each warp includes 32 threads. The scheduler unit 910 may manage a plurality of different thread blocks, allocating the thread blocks to warps for execution and then scheduling instructions from the plurality of different warps on the various functional units (i.e., cores 950, DPUs 951, SFUs 952, and LSUs 953) during each clock cycle.

In one embodiment, each scheduler unit 910 includes one or more instruction dispatch units 915. Each dispatch unit 915 is configured to transmit instructions to one or more of the functional units. In the embodiment shown in FIG. 9, the scheduler unit 910 includes two dispatch units 915 that enable two different instructions from the same warp to be dispatched during each clock cycle. In alternative embodiments, each scheduler unit 910 may include a single dispatch unit 915 or additional dispatch units 915.

Each SM 850 includes a register file 920 that provides a set of registers for the functional units of the SM 850. In one embodiment, the register file 920 is divided between each of the functional units such that each functional unit is allocated a dedicated portion of the register file 920. In another embodiment, the register file 920 is divided between the different warps being executed by the SM 850. The register file 920 provides temporary storage for operands connected to the data paths of the functional units.

Each SM 850 comprises L processing cores 950. In one embodiment, the SM 850 includes a large number (e.g., 192, etc.) of distinct processing cores 950. Each core 950 is a fully-pipelined, single-precision processing unit that includes a floating point arithmetic logic unit and an integer arithmetic logic unit. In one embodiment, the floating point arithmetic logic units implement the IEEE 754-2008 standard for floating point arithmetic. Each SM 850 also comprises M DPUs 951 that implement double-precision floating point arithmetic, N SFUs 952 that perform special functions (e.g., copy rectangle, pixel blending operations, and the like), and P LSUs 953 that implement load and store operations between the shared memory/L1 cache 970 and the register file 920. In one embodiment, the SM 850 includes 64 DPUs 951, 32 SFUs 952, and 32 LSUs 953.

Each SM 850 includes an interconnect network 980 that connects each of the functional units to the register file 920 and the shared memory/L1 cache 970. In one embodiment, the interconnect network 980 is a crossbar that can be configured to connect any of the functional units to any of the registers in the register file 920 or the memory locations in shared memory/L1 cache 970.

In one embodiment, the SM 850 is implemented within a GPU. In such an embodiment, the SM 850 comprises J texture units 990. The texture units 990 are configured to load texture maps (i.e., a 2D array of texels) from the memory 804 and sample the texture maps to produce sampled texture values for use in shader programs. The texture units 990 implement texture operations such as anti-aliasing operations using mip-maps (i.e., texture maps of varying levels of detail). In one embodiment, the SM 850 includes 16 texture units 990.

The PPU 800 described above may be configured to perform highly parallel computations much faster than conventional CPUs. Parallel computing has advantages in graphics processing, data compression, biometrics, stream processing algorithms, and the like.

Figure 10:
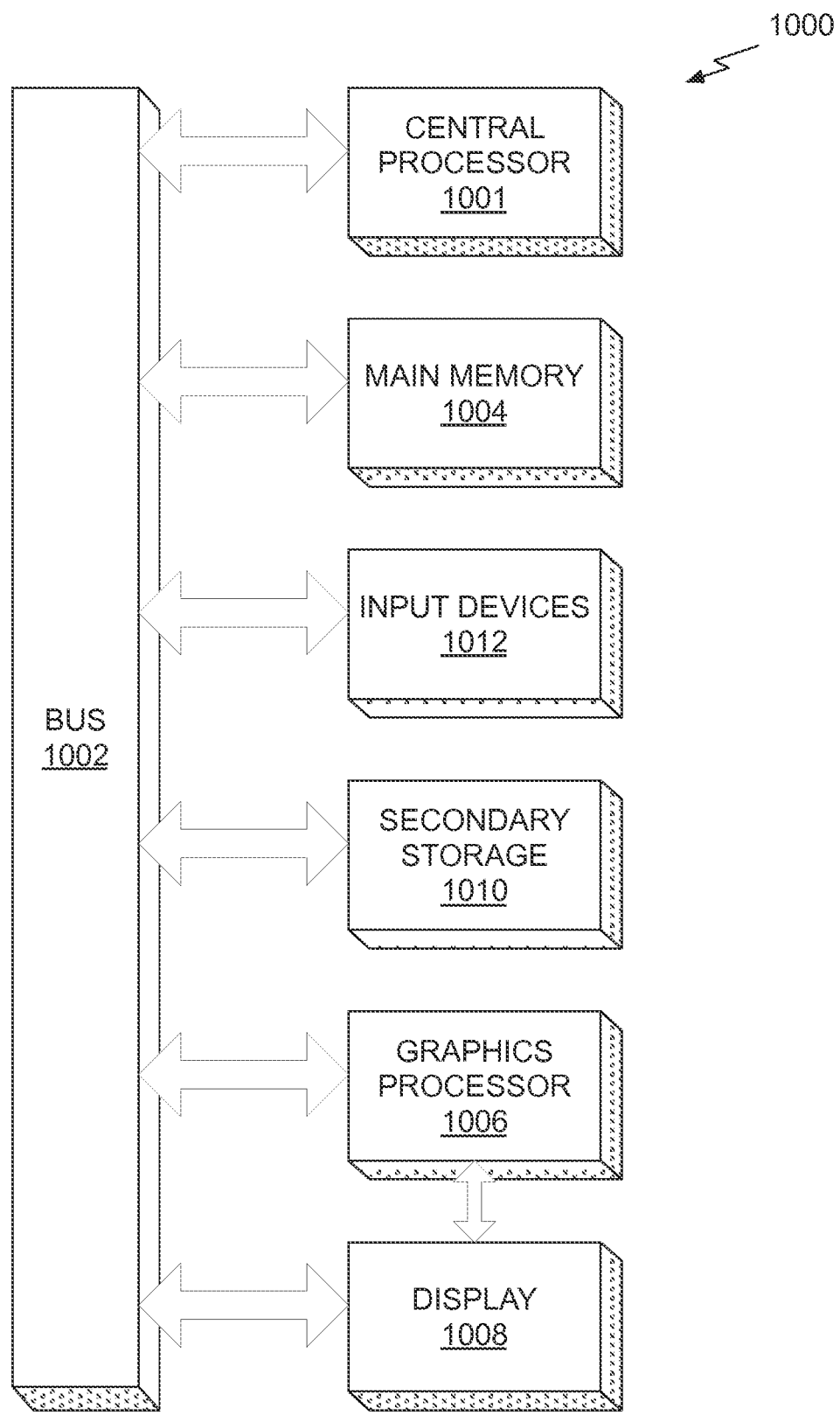
FIG. 10 illustrates an exemplary system in which the various architecture and/or functionality of the various previous embodiments may be implemented.

FIG. 10 illustrates an exemplary system 1000 in which the various architecture and/or functionality of the various previous embodiments may be implemented. As shown, a system 1000 is provided including at least one central processor 1001 that is connected to a communication bus 1002. The communication bus 1002 may be implemented using any suitable protocol, such as PCI (Peripheral Component Interconnect), PCI-Express, AGP (Accelerated Graphics Port), HyperTransport, or any other bus or point-to-point communication protocol(s). The system 1000 also includes a main memory 1004. Control logic (software) and data are stored in the main memory 1004 which may take the form of random access memory (RAM).

The system 1000 also includes input devices 1012, a graphics processor 1006, and a display 1008, i.e. a conventional CRT (cathode ray tube), LCD (liquid crystal display), LED (light emitting diode), plasma display or the like. User input may be received from the input devices 1012, e.g., keyboard, mouse, touchpad, microphone, and the like. In one embodiment, the graphics processor 1006 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 1000 may also include a secondary storage 1010. The secondary storage 1010 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. Computer programs, or computer control logic algorithms, may be stored in the main memory 1004 and/or the secondary storage 1010. Such computer programs, when executed, enable the system 1000 to perform various functions. The main memory 1004, the storage 1010, and/or any other storage are possible examples of computer-readable media.

In one embodiment, the architecture and/or functionality of the various previous figures may be implemented in the context of the central processor 1001, the graphics processor 1006, an integrated circuit (not shown) that is capable of at least a portion of the capabilities of both the central processor 1001 and the graphics processor 1006, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 1000 may take the form of a desktop computer, laptop computer, server, workstation, game consoles, embedded system, and/or any other type of logic. Still yet, the system 1000 may take the form of various other devices including, but not limited to a personal digital assistant (PDA) device, a mobile phone device, a television, etc.

Further, while not shown, the system 1000 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
receiving, by a parallel processing unit including streaming multiprocessors that execute a plurality of threads concurrently, a three-dimensional (3D) primitive, wherein the primitive has a size that is less than a threshold value;
identifying a screen-space position within the primitive;
reading, from a pixel sample map that is stored in a memory, sub-pixel coverage information using the position, wherein the sub-pixel coverage information is a value representing a distance between the screen-space position and a location of a sub-pixel sample within a pixel;
comparing the distance with the size of the primitive to determine whether the screen-space position coincides with the sub-pixel sample; and
processing the primitive, by the parallel processing unit, if the screen-space position coincides with the sub-pixel sample, or rejecting the primitive if the screen-space position does not coincide with the sub-pixel sample.

2. The method of claim 1, wherein the identifying comprises rasterizing of the primitive.

3. The method of claim 1, wherein the parallel processing unit is a graphics processor that is configured to execute at least one of a vertex shader and a geometry shader.

4. The method of claim 1, wherein a vertex shader and a fast geometry shader are run in sequence on a first streaming multiprocessor of the streaming multiprocessors to process the primitive.

5. The method of claim 1, wherein the sub-pixel coverage information includes a single bit indicating whether the position is a location of a sub-pixel sample within a pixel.

6. The method of claim 1, wherein the screen-space position is within a bounding volume that encloses the small 3D primitive.

7. The method of claim 6, wherein the screen-space position is a center of the bounding volume.

8. The method of claim 1, further comprising regenerating the pixel sample map when at least one sub-pixel sample location changes.

9. A method, comprising:
receiving, by a parallel processing unit including streaming multiprocessors that execute a plurality of threads concurrently, a three-dimensional (3D) primitive, wherein the primitive has a size that is less than a threshold value;
identifying a screen-space position within the primitive;
reading, from a pixel sample map that is stored in a memory, sub-pixel coverage information using the position, wherein the sub-pixel coverage information is a value representing a distance between the screen-space position and a location of a sub-pixel sample within a pixel; and
processing the primitive, by the parallel processing unit, when the size of the primitive is less than the distance, or rejecting the primitive when the size of the primitive is not less than the distance.

10. The method of claim 1, further comprising:
rendering geometry representing each sub-pixel sample to produce rasterized sub-pixel coverage information for the geometry; and
storing the rasterized sub-pixel coverage information in the pixel sample map.

11. A method, comprising:
receiving, by a parallel processing unit including streaming multiprocessors that execute a plurality of threads concurrently, a three-dimensional (3D) primitive, wherein the primitive has a size that is less than a threshold value;
identifying a screen-space position within the primitive;
computing, for each location in a pixel sample map that is stored in a memory, a distance between the location and a nearest sub-pixel sample of rendered geometry within a pixel;
storing the distance at each location in the pixel sample map;
reading, using the screen-space position as the location, the distance from the pixel sample map to produce sub-pixel coverage information; and
processing the primitive, by the parallel processing unit, if the screen-space position coincides with a sub-pixel sample according to the sub-pixel coverage information, or rejecting the primitive if the screen-space position does not coincide with a sub-pixel sample according to the sub-pixel coverage information.

12. A non-transitory computer readable medium, storing instructions that, when executed by a processor, cause the processor to perform steps, comprising:
receiving, by a parallel processing unit including streaming multiprocessors that execute a plurality of threads concurrently, a three-dimensional (3D) primitive, wherein the primitive has a size that is less than a threshold value;
identifying a screen-space position within the primitive;
reading, from a pixel sample map that is stored in a memory, sub-pixel coverage information using the position, wherein the sub-pixel coverage information is a value representing a distance between the screen-space position and a location of a sub-pixel sample within a pixel;
comparing the distance with the size of the primitive to determine whether the screen-space position coincides with the sub-pixel sample; and
processing the primitive, by the parallel processing unit, if the screen-space position coincides with the sub-pixel sample, or rejecting the primitive if the screen-space position does not coincide with the sub-pixel sample.

13. A system, comprising:
a parallel processing unit that is coupled to a memory and includes streaming multiprocessors that execute a plurality of threads concurrently and are configured to:
receive a three-dimensional (3D) primitive, wherein the primitive has a size that is less than a threshold value;
identify a screen-space position within the primitive;
read, from a pixel sample map that is stored in the memory, sub-pixel coverage information using the position, wherein the sub-pixel coverage information is a value representing a distance between the screen-space position and a location of a sub-pixel sample within a pixel;

compare the distance with the size of the primitive to determine whether the screen-space position coincides with the sub-pixel sample; and process the primitive if the screen-space position coincides with the sub-pixel sample, or rejecting the primitive if the screen-space position does not coincide with the sub-pixel sample.

14. The system of claim 13, wherein the parallel processing unit comprises a cache and the entire pixel sample map is stored in the cache.

15. The system of claim 13, wherein the parallel processing unit is a graphics processor configured to operate in a multi-sample rendering mode.

16. The system of claim 13, wherein the identifying comprises rasterizing of the primitive.

17. The system of claim 13, wherein a vertex shader and a fast geometry shader are run in sequence on a first streaming multiprocessor of the streaming multiprocessors to process the primitive.

* * * * *